United States Patent
Matsumura et al.

(10) Patent No.: US 7,479,931 B2
(45) Date of Patent: Jan. 20, 2009

(54) ADJUSTING APPARATUS, METHOD, AND RECORDING MEDIUM, AND ABNORMALITY DISPLAY APPARATUS, METHOD, AND RECORDING MEDIUM

(75) Inventors: Ikuo Matsumura, Tokyo (JP); Hiroshi Kaneda, Tokyo (JP); Yoshimitsu Tanaka, Kanagawa (JP)

(73) Assignee: Sony Corporation (JP)

( * ) Notice: Subject to any disclaimer, the term of this patent is extended or adjusted under 35 U.S.C. 154(b) by 300 days.

(21) Appl. No.: 09/974,329

(22) Filed: Oct. 9, 2001

(65) Prior Publication Data

US 2002/0075288 A1  Jun. 20, 2002

(30) Foreign Application Priority Data

Oct. 10, 2000 (JP) ............... P2000-309794
Oct. 10, 2000 (JP) ............... P2000-309795

(51) Int. Cl.
G09G 5/00 (2006.01)
G09G 5/02 (2006.01)

(52) U.S. Cl. ............... 345/1.1; 345/581; 345/594
(58) Field of Classification Search ......... 345/581–594, 345/1.1
See application file for complete search history.

(56) References Cited

U.S. PATENT DOCUMENTS

| | | | |
|---|---|---|---|
| 4,742,344 A * | 5/1988 | Nakagawa et al. ............ 345/26 |
| 5,072,214 A * | 12/1991 | Dellinger et al. ............ 345/551 |
| 5,325,471 A * | 6/1994 | Inoue ........................ 345/427 |
| 5,739,809 A * | 4/1998 | McLaughlin et al. ........ 345/594 |
| 5,898,436 A * | 4/1999 | Stewart et al. .............. 345/594 |
| 6,278,433 B2 * | 8/2001 | Narui ........................ 345/581 |
| 6,287,197 B1 * | 9/2001 | Dickinson et al. ............ 463/31 |

FOREIGN PATENT DOCUMENTS

JP  03226810 A  * 10/1991
JP  06289800     10/1994

* cited by examiner

Primary Examiner—Sumati Lekowitz
Assistant Examiner—Srilakshmi K Kumar
(74) Attorney, Agent, or Firm—Lerner, David, Littenberg, Krumholz & Mentlik, LLP

(57) ABSTRACT

An apparatus for adjustment and abnormality display includes a pseudo screen displaying unit for displaying each of a plurality of display units forming a display apparatus as a pseudo display unit according to position information of the display units; a selecting unit for selecting a specified pseudo display unit from the pseudo display units displayed; an adjusting information generating unit for generating information for adjusting the display unit corresponding to the pseudo display unit selected based on an adjusting operation; and an abnormality signal generating unit for generating an abnormality signal when an abnormality occurs in a display unit forming the display apparatus, wherein the selected display unit is adjusted by outputting the adjusting information to the display apparatus, and the pseudo display unit corresponding to the display unit having the abnormality is distinguishably displayed in the pseudo screen displaying unit based on the abnormality signal.

9 Claims, 23 Drawing Sheets

FIG. 13

| SYNC | SID1 | DID1 | Reserved | Reserved | Reserved | SID2 | DID2 | CTRL | SIZE |
|---|---|---|---|---|---|---|---|---|---|
| RC | Reserved | X | Y | Z | Command | Mode1 | Mode2 | ADJ | LUM | DATA | Element | Px | Py | Reserved | Reserved | FCS | SYNC |

RGB TRIO (DOT)

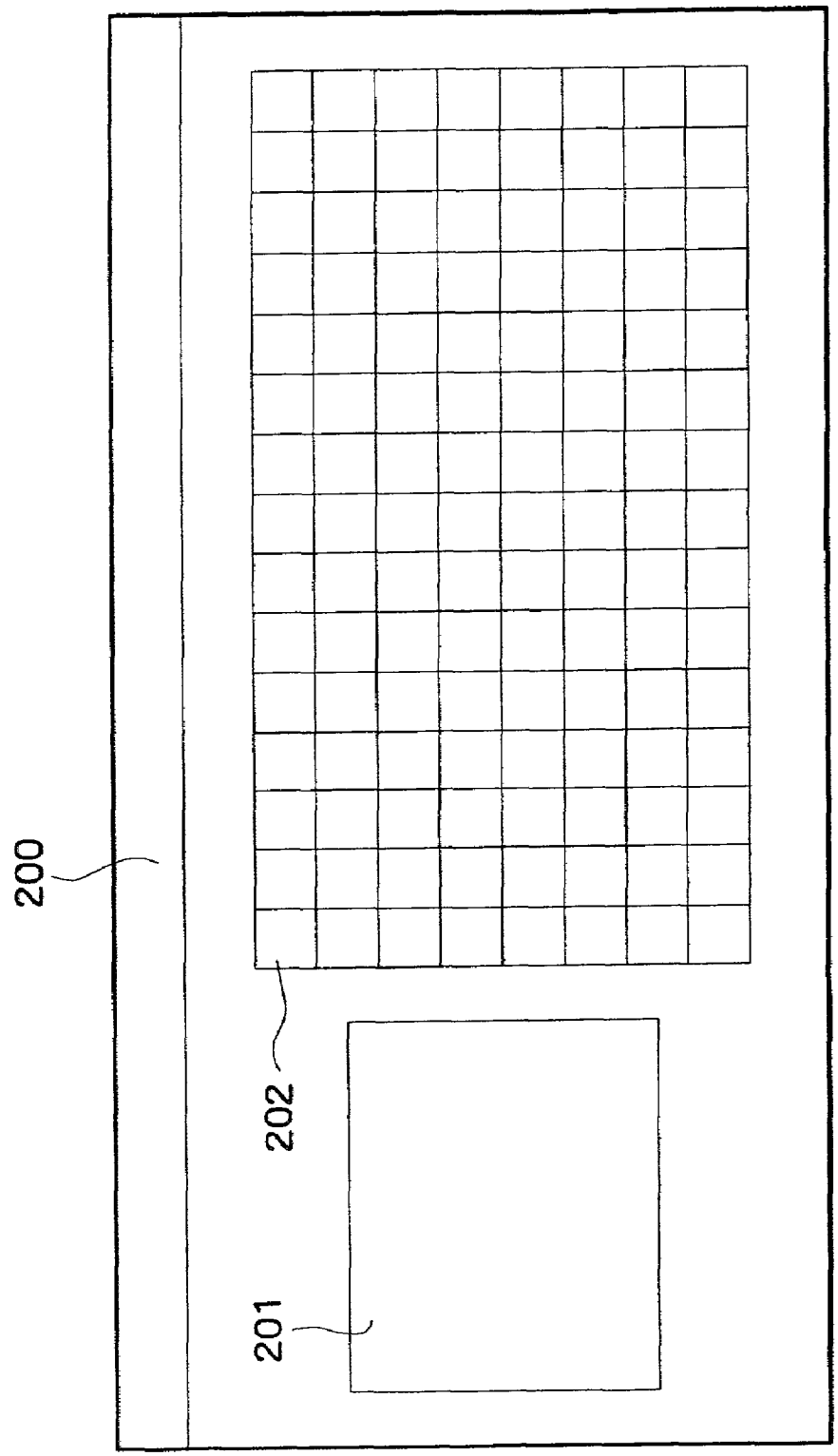

ADJUSTING APPARATUS, METHOD, AND RECORDING MEDIUM, AND ABNORMALITY DISPLAY APPARATUS, METHOD, AND RECORDING MEDIUM

BACKGROUND OF THE INVENTION

The present invention relates to an apparatus and a method for adjusting a display unit and a cell that form a display apparatus, and an apparatus and a method for abnormality error information display that detect and display an abnormality error signal when an abnormality error occurs in a display unit forming the display apparatus.

Recently, a display system has been constructed which displays a video signal reproduced by a video reproducing apparatus on a large screen apparatus formed by a plurality of display units installed outdoors.

As shown in FIG. 23, for example, a conventional display system 2 for displaying a video signal includes: a video signal unit 50; a video signal selecting unit 51; a video processing unit 52; a screen unit 53 formed by a plurality of display units; a control unit 54; a power unit 55; an adjusting unit 56; and an abnormality signal detecting unit 57.

The video signal unit 50 is connected with apparatus such for example as a VCR (Video Cassette Recorder), a DVD (Digital Versatile Disc) (trademark), a video camera, a TV tuner, a satellite broadcasting tuner, and a storage. The video signal unit 50 supplies video signals to the video signal selecting unit 51.

The video signal selecting unit 51 selects a specified video signal from the plurality of video signals supplied from the video signal unit 50. The video signal selecting unit 51 then supplies the selected video signal to the video processing unit 52.

The video processing unit 52 subjects the video signal supplied from the video signal selecting unit 51 to predetermined video processing to thereby generate a post-processing video signal so that the video signal is divided and displayed by the display units of the screen unit 53. The video processing unit 52 then supplies the post-processing video signal to the screen unit 53.

The screen unit 53 is formed by a plurality of display units as shown in FIG. 24. Cells formed by light emitting elements as shown in FIG. 25 such as light emitting diodes are arranged in a matrix manner in a display unit of the screen unit 53. A cell is formed by a light emitting element a, a light emitting element b, and a light emitting element c, for example. Each of the display units displays its corresponding part on the basis of the post-processing video signal supplied from the video processing unit 52, whereby the screen unit 53 displays one display image.

The control unit 54 controls the video processing unit 52 so as to adjust the size, display position and the like of a display image displayed on the screen unit 53 and thereby obtain a specified display form.

The power unit 55 supplies power to the screen unit 53.

The adjusting unit 56 selects the plurality of display units forming the screen unit 53 or the plurality of cells forming one of the display units as a target for specified adjustment.

The abnormality signal detecting unit 57 detects an abnormality signal generated by a display unit forming the screen unit 53. Also, the abnormality signal detecting unit 57 has a display unit for displaying the nature of the abnormality according to the abnormality signal.

In operation for adjusting a display unit or a cell forming the screen unit 53, the adjusting unit 56, being directly connected to the screen unit 53, obtains so-called screen information indicating numbers or the like corresponding to the position of the plurality of display units forming the screen unit 53 and the plurality of cells forming the display units, whereby the conventional display system 2 adjusts the specified display unit and/or cell.

When abnormality occurs in one or more display units forming the screen unit 53, the abnormality signal detecting unit 57 provided in the display system 2 detects an abnormality signal generated by the one or more display units having the abnormality, then displays the nature of the abnormality in characters on the display unit provided to the abnormality signal detecting unit 57 according to the abnormality signal, and also displays the position of the display unit that has generated the abnormality signal by a numerical value such as a number corresponding to that position according to the abnormality signal.

However, when adjusting a display unit and/or a cell forming the screen unit by using the conventional adjusting apparatus, it is difficult to check adjusting operation and information about the target to be adjusted at a first glance because the display unit for displaying the adjusting operation and the like provided to the adjusting apparatus has a limited display area and the display unit displays the position of the display unit and/or cell to be adjusted by a numerical value such as a number.

Also, when adjusting a display unit and/or a cell forming the screen unit by using the conventional adjusting apparatus, the adjusting apparatus has one adjusting screen for each of the display units, and thus the adjusting apparatus has adjusting screens equal in number to that of display units. Therefore, the adjusting apparatus requires much space, resulting in increases in the size and cost of the adjusting apparatus.

In addition, the conventional adjusting apparatus selects a specified display unit or cell from the display units or the cells forming the screen unit by operation of so-called numerical value input using a ten-key numerical pad. Therefore, the selection of the specified display unit or cell requires much time.

In addition, when adjusting a display unit and/or a cell forming the screen unit by using the conventional adjusting apparatus, in a case where the adjusting apparatus selects a specific display unit and/or cell, makes a specified adjustment of the display unit and/or cell, and thereafter makes a different adjustment of the same display unit and/or cell, the different adjustment needs to be started by selecting the same display unit and/or cell once again. Therefore, it is not possible to make continuous adjustments, which results in low procedural efficiency.

Moreover, when adjusting chromaticity of the screen unit by using the conventional adjusting apparatus, if the number of display units and cells forming the screen unit is increased with the size of the screen unit, the target to be adjusted may be lost in the display units or cells.

Moreover, when abnormality occurs in one or more display units forming the screen unit, the conventional abnormality signal detecting unit displays the one or more display units that have generated an abnormality signal by a numerical value. Therefore, it is difficult to immediately identify the display unit of the screen unit having the abnormality.

Furthermore, with the conventional abnormality signal detecting unit, when replacing the one or more display units forming the screen unit and having abnormality, it is difficult to immediately identify the one or more display units having the abnormality, and therefore replacing operation requires much time.

SUMMARY OF THE INVENTION

In view of the foregoing, the present invention has been made, and it is accordingly an object of the present invention to provide an apparatus and a method for adjustment that make it possible to readily adjust a display image of a display apparatus formed by a plurality of display units, and an apparatus and a method for detecting an abnormality signal that make it possible to immediately identify a display unit having abnormality when the abnormality occurs in the display unit forming the screen unit of the display apparatus.

In order to solve the above problems, according to the present invention, there is provided an adjusting apparatus for adjusting a display apparatus, the display apparatus being formed by a plurality of display units each displaying a part of an image based on an input video signal and having a screen information storing means for storing screen information including position information indicating positions of the display units, the adjusting apparatus comprising: a pseudo screen displaying means for schematically displaying each of the display units forming the display apparatus as a pseudo display unit according to the position information of the display units supplied from the screen information storing means; a selecting means for selecting a specified pseudo display unit from the pseudo display units displayed in the pseudo screen displaying means; and an adjusting information generating means for generating information for adjusting the display unit corresponding to the pseudo display unit selected by the selecting means on the basis of adjusting operation; wherein the display unit selected by the selecting means is adjusted by outputting the adjusting information to the display apparatus.

The adjusting apparatus adjusts the selected display unit by outputting the adjusting information generated by the adjusting information generating means to the display apparatus.

In order to solve the above problems, according to the present invention, there is provided an adjusting method for adjusting a display apparatus, the display apparatus being formed by a plurality of display units each displaying a part of an image based on an input video signal and having a screen information storing means for storing screen information including at least position information indicating positions of the display units, the adjusting method comprising the steps of: schematically displaying each of the display units forming the display apparatus as a pseudo display unit according to the position information of the display units read from the screen information storing means; selecting a specified pseudo display unit from the displayed pseudo display units; generating information for adjusting the display unit corresponding to the selected pseudo display unit on the basis of adjusting operation; and adjusting the display unit of the display apparatus on the basis of the generated adjusting information.

The adjusting method adjusts the selected display unit on the basis of the adjusting information generated by the adjusting operation.

In order to solve the above problems, according to the present invention, there is provided a recording medium storing an adjusting program for adjusting a display apparatus, the display apparatus being formed by a plurality of display units each displaying a part of an image based on an input video signal and having a screen information storing means for storing screen information including at least position information indicating positions of the display units, the program comprising: display processing for schematically displaying each of the display units forming the display apparatus as a pseudo display unit according to the position information of the display units read from the screen information storing means; selecting processing for selecting a specified pseudo display unit from the displayed pseudo display units; generating processing for generating information for adjusting the display unit corresponding to the selected pseudo display unit on the basis of adjusting operation; and adjusting processing for adjusting the display unit of the display apparatus on the basis of the generated adjusting information.

The recording medium stores the program comprising: display processing for schematically displaying the display units forming the display apparatus as pseudo display units; selecting processing for selecting a specified pseudo display unit from the pseudo display units displayed by the display processing; generating processing for generating adjusting information on the basis of adjusting operation; and adjusting processing for adjusting the display unit corresponding to the pseudo display unit selected by the selecting processing on the basis of the adjusting information generated by the generating processing.

In order to solve the above problems, according to the present invention, there is provided an abnormality display apparatus for displaying an abnormality of a display unit on the basis of an abnormality signal from a display apparatus, the display apparatus being formed by a plurality of display units each displaying a part of an image based on an input video signal and having: a screen information supplying means for supplying screen information including at least position information indicating positions of the display units; and an abnormality signal generating means for generating the abnormality signal when the abnormality occurs in the display unit, the abnormality display apparatus comprising: a pseudo screen displaying means for schematically displaying each of the display units forming the display apparatus as a pseudo display unit according to the position information of the display units supplied by the screen information supplying means; wherein the pseudo display unit corresponding to the display unit having the abnormality is distinguishably displayed in the pseudo screen displaying means on the basis of the abnormality signal generated by the abnormality signal generating means.

When the abnormality occurs in the display unit forming the display apparatus, the abnormality display apparatus distinguishably displays the pseudo display unit corresponding to the display unit having the abnormality among the pseudo display units schematically displayed in the pseudo screen displaying means.

In order to solve the above problems, according to the present invention, there is provided an abnormality display method for displaying an abnormality of a display apparatus, the display apparatus being formed by a plurality of display units each displaying a part of an image based on an input video signal and having: a screen information supplying means for supplying screen information including at least position information indicating positions of the display units; and an abnormality signal generating means for generating an abnormality signal when the abnormality occurs in the display unit, the abnormality display method comprising the steps of: schematically displaying each of the display units forming the display apparatus as a pseudo display unit according to the position information of the display units supplied by the screen information supplying means; generating the abnormality signal when the abnormality occurs in the display unit; and distinguishably displaying the pseudo display unit corresponding to the display unit having the abnormality on the basis of the generated abnormality signal.

When the abnormality occurs in the display unit forming the display apparatus, the abnormality display method distinguishably displays the pseudo display unit corresponding to the display unit having the abnormality among the schematically displayed pseudo display units.

In order to solve the above problems, according to the present invention, there is provided a recording medium storing a display program for displaying an abnormality of a display apparatus, the display apparatus being formed by a plurality of display units each displaying a part of an image based on an input video signal and having: a screen information supplying means for supplying screen information including at least position information indicating positions of the display units; and an abnormality signal generating means for generating an abnormality signal when the abnormality occurs in the display unit, the program comprising: display processing for schematically displaying each of the display units forming the display apparatus as a pseudo display unit according to the position information of the display units supplied by the screen information supplying means; and distinguishable display processing for distinguishably displaying the pseudo display unit corresponding to the display unit having the abnormality on the basis of the abnormality signal.

The recording medium stores the program comprising: display processing for schematically displaying the display units forming the display apparatus as pseudo display units; abnormality signal generating processing for generating the abnormality signal when the abnormality occurs in the display unit; and distinguishable display processing for distinguishably displaying the pseudo display unit corresponding to the display unit having the abnormality.

BRIEF DESCRIPTION OF THE DRAWINGS

FIG. 13 shows a command transmitted from the adjusting unit to the video processing unit provided in the display system;

FIG. 18 shows a GUI of an abnormal display unit displaying window for displaying abnormality information when an abnormality occurs in a display unit forming the screen unit, the abnormal display unit displaying window being displayed on the abnormality signal detecting unit to which the present invention is applied;

DETAILED DESCRIPTION OF THE PREFERRED EMBODIMENTS

Preferred embodiments of the present invention will hereinafter be described in detail with reference to the drawings.

Figure 1:
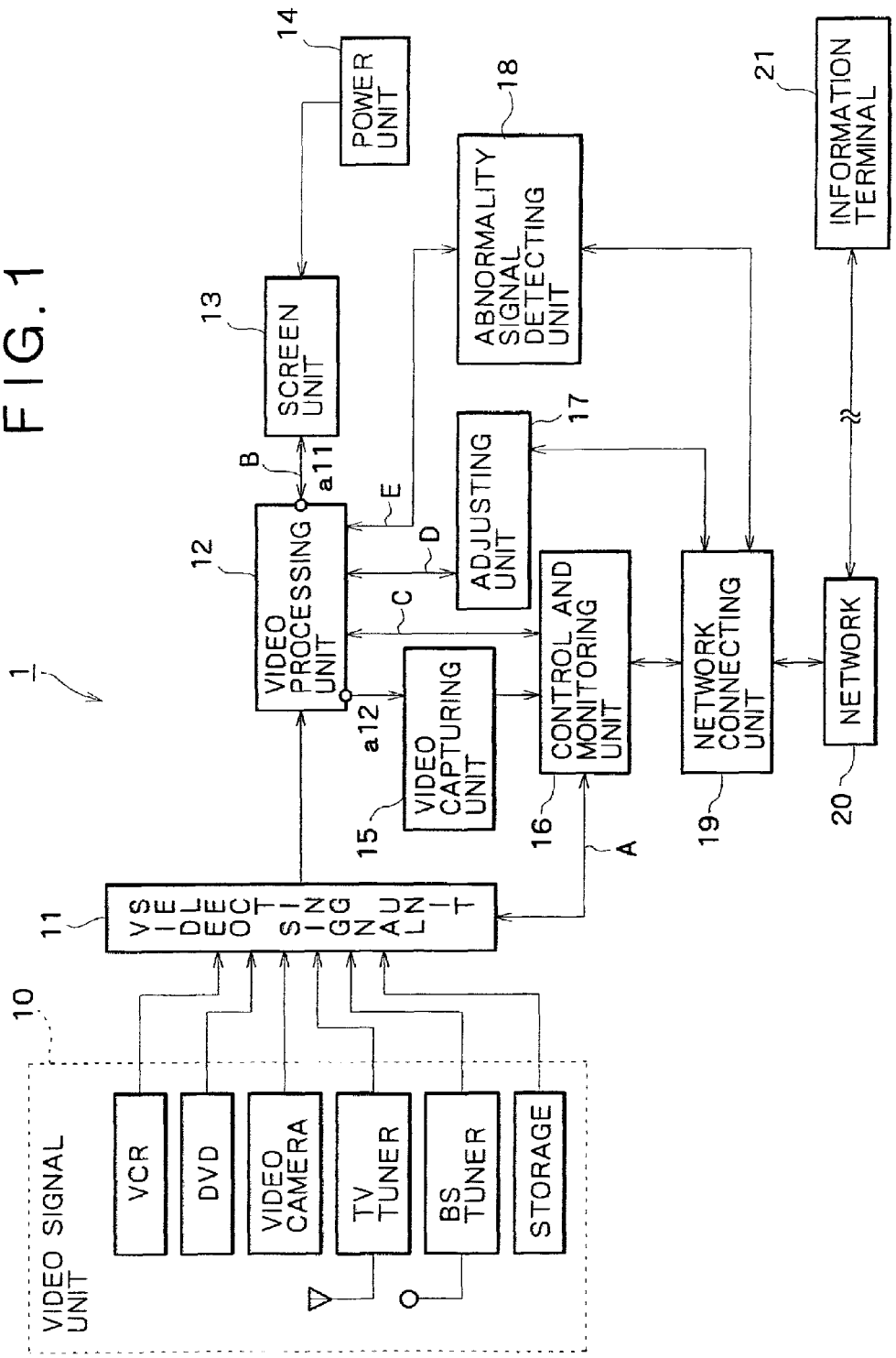
FIG. 1 is a block diagram showing configuration of a display system to which the present invention is applied.

The present invention is applied to a display system 1 as shown in FIG. 1, for example.

The display system 1 includes: a video signal unit 10; a video signal selecting unit 11; a video processing unit 12; a screen unit 13 formed by a plurality of display units; a power unit 14; a video capturing unit 15; a control and monitoring unit 16; an adjusting unit 17; and an abnormality signal detecting unit 18. The video signal unit 10, the screen unit 13 formed by a plurality of display units, and the power unit 14 in the display system 1 form a display apparatus for displaying an input video signal as one screen.

The display system 1 is connected to a network 20 via a network connecting unit 19 that is connected to the control and monitoring unit 16. Further, the network 20 is connected with a plurality of networks and a plurality of information terminals 21.

The video signal unit 10 is connected with apparatus such for example as a VCR (Video Cassette Recorder), a DVD (Digital Versatile Disc) (trademark), a video camera, a TV tuner, a satellite broadcasting tuner, and a storage. The video signal unit 10 supplies video signals to the video signal selecting unit 11.

The video signal selecting unit 11 selects a required video signal from the plurality of video signals supplied from the video signal unit 10. The video signal selecting unit 11 then supplies the selected video signal to the video processing unit 12. Connected to the control and monitoring unit 16 via a signal line A, the video signal selecting unit 11 selects a video signal and schedules video signals on the basis of a signal supplied from the control and monitoring unit 16.

The video processing unit 12 subjects the video signal supplied from the video signal selecting unit 11 to predetermined video processing to thereby generate a post-processing video signal to be divided and displayed by the display units. The video processing unit 12 has a first video signal output terminal a11 and a second video signal output terminal $a12$. The first video signal output terminal a11 provided to the video processing unit 12 is connected to the screen unit 13 to supply the post-processing video signal to the screen unit 13, whereas the second video signal output terminal $a12$ is connected to the video capturing unit 15 to supply the post-processing video signal to the video capturing unit 15.

Also, the video processing unit 12 is connected to the screen unit 13 via a signal line B, connected to the control and monitoring unit 16 via a signal line C, connected to the adjusting unit 17 via a signal line D, and connected to the abnormality signal detecting unit 18 via a signal line E to send and receive control signals and data necessary for video signal processing.

The video processing unit 12 further includes a composite video output terminal for outputting the post-processing video signal to an external display apparatus.

The screen unit 13 displays the post-processing video signal supplied from the video processing unit 12 as a display image.

The screen unit 13 will be described in the following.

Figure 24:
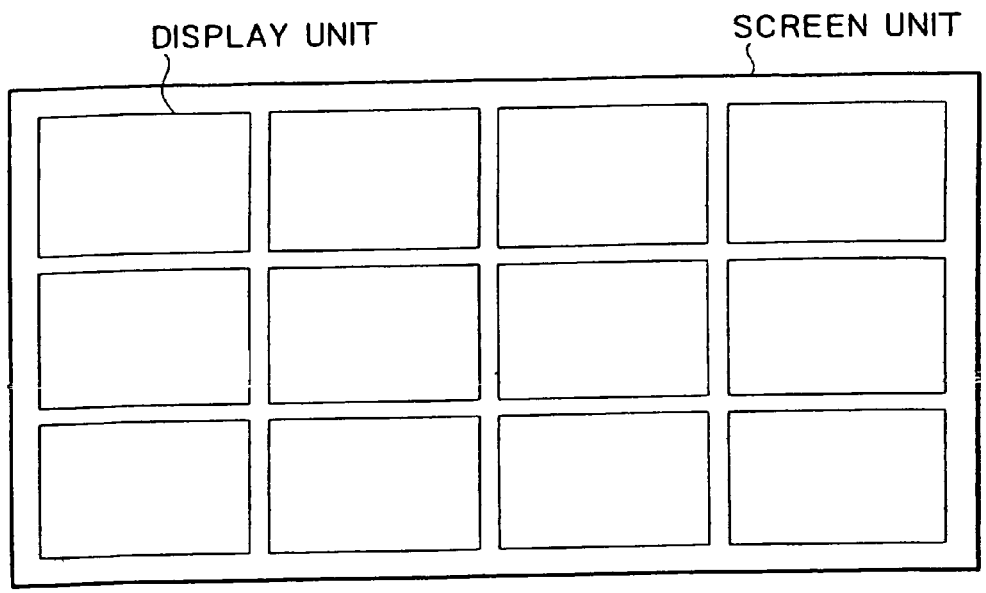
FIG. 24 is a diagram showing that a screen unit provided in the display system is formed by a plurality of display units.
Figure 25:
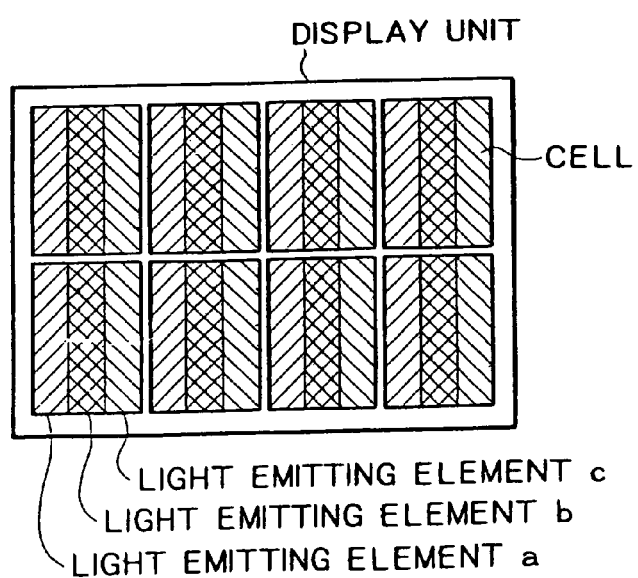
FIG. 25 is a diagram showing that a display unit forming the screen unit provided in the display system is formed by a plurality of cells.

The screen unit 13 is a large video display apparatus formed by a plurality of display units as shown in FIG. 24, and a display unit is further formed by a plurality of cells. The cells formed by light emitting elements shown in FIG. 25 such as light emitting diodes are arranged in a matrix manner in a display unit of the screen unit 13. A cell is formed by a light emitting element a, a light emitting element b, and a light emitting element c, for example. The light emitting element a may be a blue light emitter, the light emitting element b may be a red light emitter, and the light emitting element c may be a green light emitter.

Figure 2:
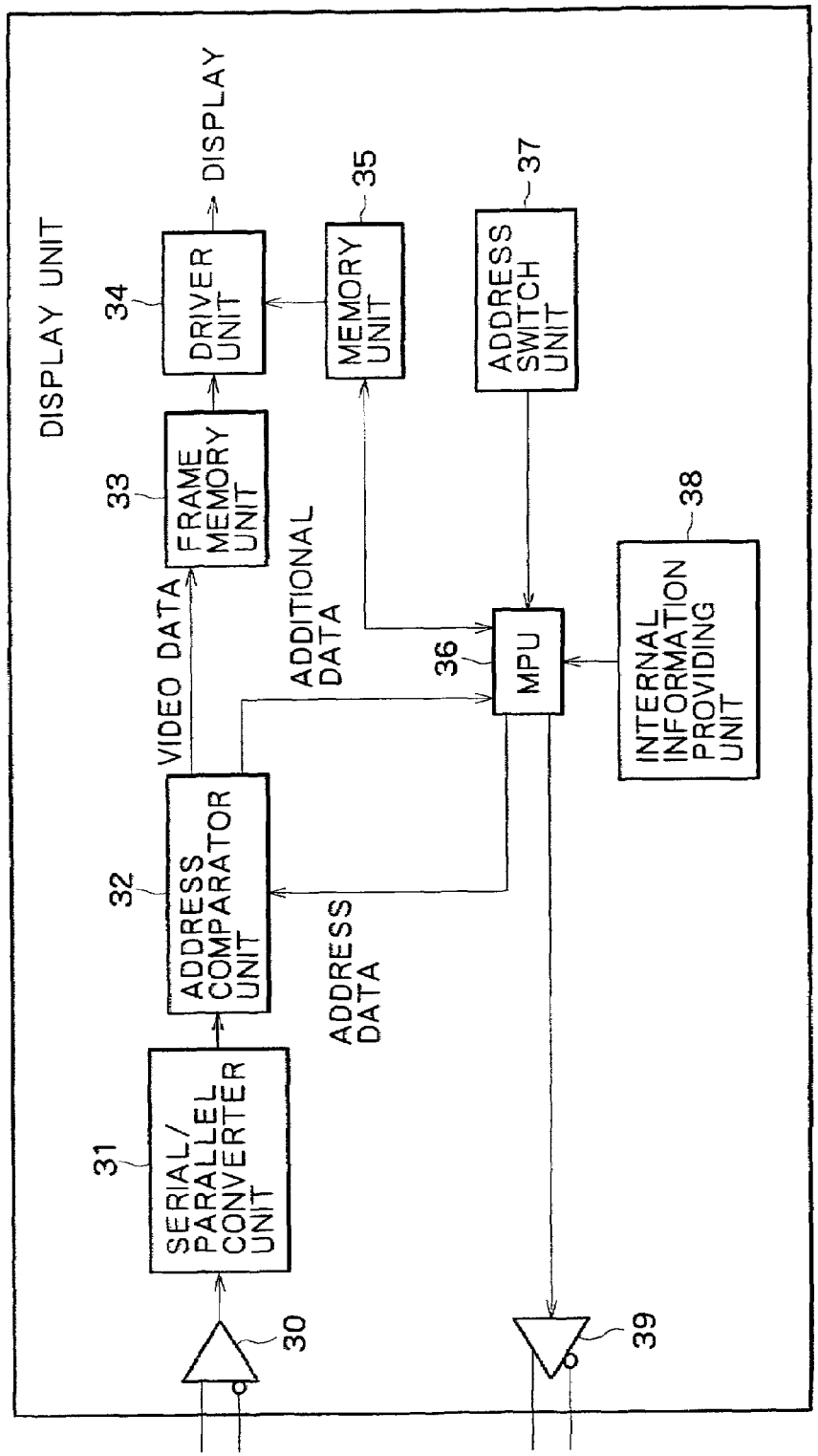
FIG. 2 is a block diagram showing configuration of a display unit forming a screen unit provided in the display system to which the present invention is applied.
Figure 3:
FIG. 3 is a diagram of assistance in explaining a post-processing video signal supplied from a video processing unit to the screen unit provided in the display system to which the present invention is applied.

Operation of an individual display unit will next be described with reference to FIG. 2. As shown in FIG. 2, a display unit includes: a line receiver 30 for receiving the post-processing video signal supplied from the video processing unit 12; a serial/parallel converter unit 31; an address comparator 32; a frame memory unit 33; a driver unit 34; a memory unit 35; an MPU 36; an address switch unit 37; an internal information providing unit 38; and a line driver 39. The post-processing video signal received by the line receiver 30 is subjected to parallel conversion by the serial/parallel converter unit 31, and then supplied to the address comparator 32. The post-processing video signal supplied from the video processing unit 12 is formed by line address data, image data, and additional data necessary for video display, as shown in FIG. 3.

Since the screen unit 13 is formed by a matrix of the plurality of display units, as described above, video data required by one display unit is different from that of another display unit. Therefore, in order to determine whether the post-processing video signal supplied from the serial/parallel converter unit 31 is necessary data for the display unit, the address comparator 32 compares the line address data of the post-processing video signal with address data supplied from the MPU 36. When the line address data coincides with the address data, the address comparator 32 separates the post-processing video signal into video data and additional data, and then supplies the video data to the frame memory unit 33 and supplies the additional data to the MPU 36. The frame memory unit 33 generates an image frame on the basis of the video data supplied from the address comparator 32, and then supplies the image frame to the driver unit 34. The driver unit 34 displays the image frame supplied from the frame memory unit 33 while referring to correction data supplied from the memory unit 35 as required.

The MPU 36 is connected with the address comparator 32, the memory unit 35, the address switch unit 37, and the line driver 39. The MPU 36 supplies the address data supplied from the address switch unit 37 to the address comparator 32. Also, the MPU 36 superimposes data supplied from the internal information providing unit 38 upon the additional data supplied from the address comparator 32, and then supplies the result to the line driver 39. The address switch unit 37 supplies the preset address data of the display unit to the MPU 36. The internal information providing unit 38 supplies the MPU 36 with abnormality information such for example as fan stop information outputted when a fan is stopped, temperature abnormality information outputted when a sensor detects a temperature abnormality within the display unit, and power abnormality information outputted when an abnormality has occurred in power supply voltage. The power abnormality information is generated when a light emitting element a, a light emitting element b, and a light emitting element c forming a cell of the display unit, for example, are set to emit light at +5 V, +12 V, and +24 V, respectively, and a voltage value of any of the light emitting elements is lowered.

The line driver 39 outputs the additional data supplied from the MPU 36. The additional data outputted from the line driver 39 is supplied to the video processing unit 12 as screen information.

Figure 4:
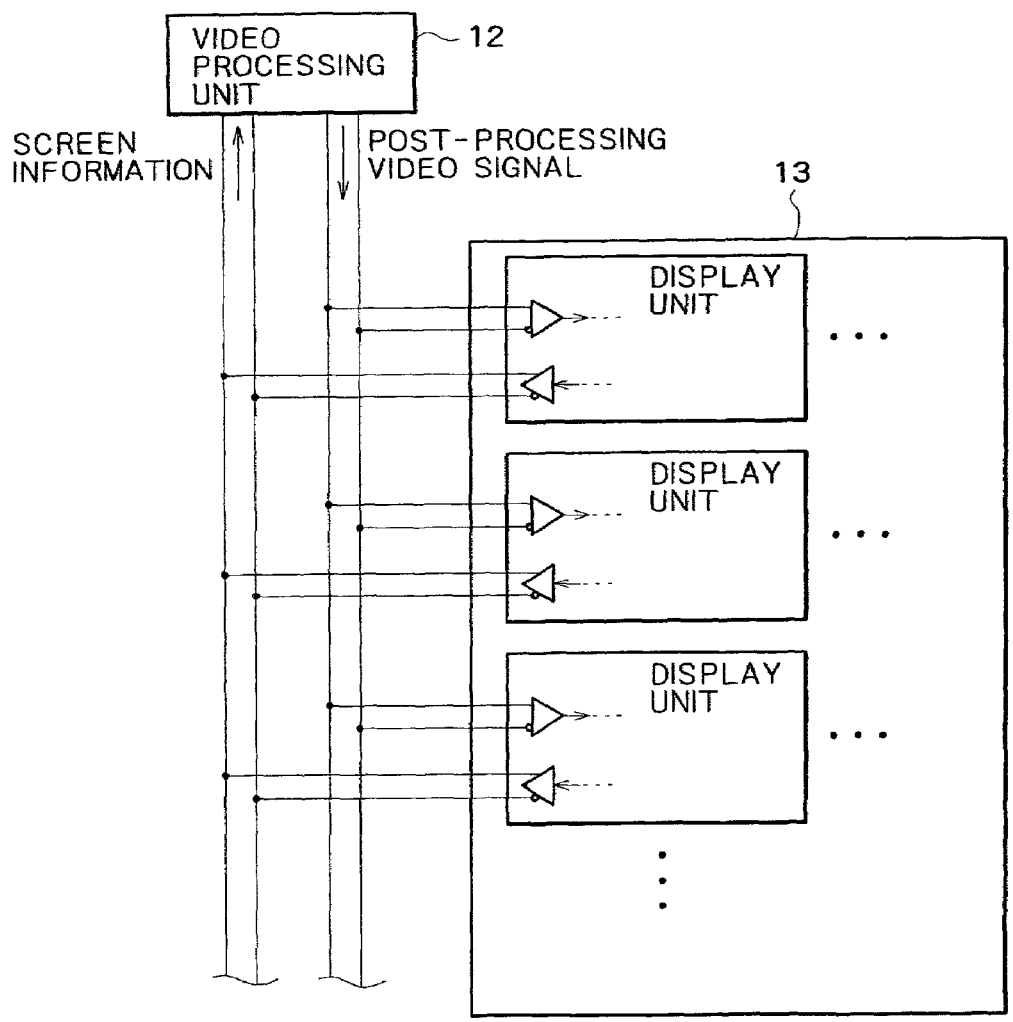
FIG. 4 is a diagram of assistance in explaining signals transmitted and received between the video processing unit and the screen unit provided in the display system to which the present invention is applied.

As shown in FIG. 4, the post-processing video signal is supplied from the video processing unit 12 to the plurality of display units of the screen unit 13, and the screen information generated by each of the display units is supplied to the video processing unit 12.

The setting of display unit information and cell information included in the above-mentioned screen information will next be described with reference to FIG. 5 and FIG. 6.

Figure 5:
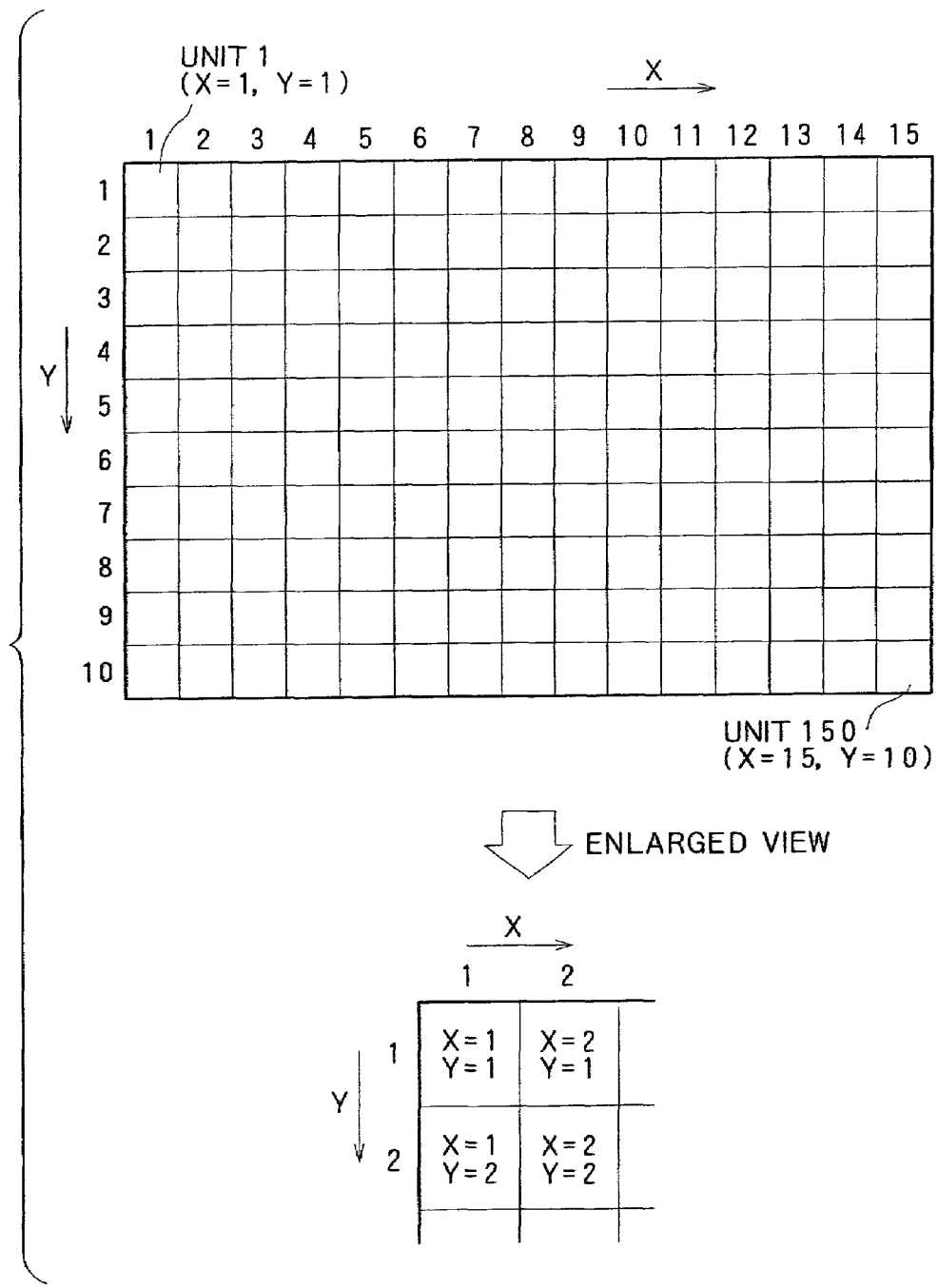
FIG. 5 illustrates the setting of display unit information of display units forming the screen unit which information is supplied to an abnormality signal detecting unit to which the present invention is applied.

As shown in FIG. 5, the screen unit 13 has 15 display units in a horizontal direction and 10 display units in a vertical direction, and is thus formed by a total of 150 display units, for example. Incidentally, the horizontal direction is set to be an X-direction and the vertical direction is set to be a Y-direction.

The screen unit 13 sets the display unit information by setting a display unit at the uppermost and leftmost position (x=1, Y=1) to be a display unit 1 and setting a display unit at the lowermost and rightmost position (X=15 Y=10) to be a display unit 150, for example.

Figure 6:
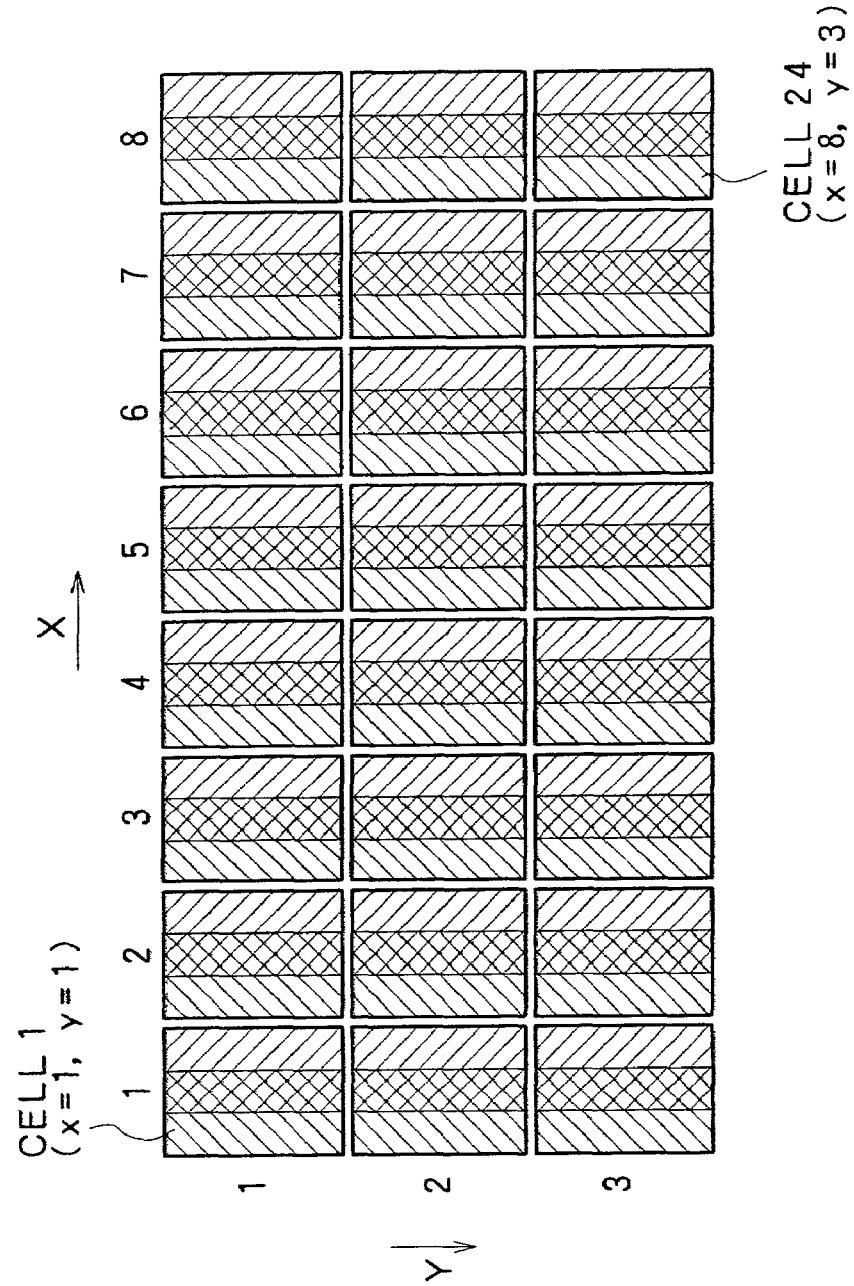
FIG. 6 illustrates the setting of cell information of cells forming a display unit of the screen unit which information is supplied to the abnormality signal detecting unit to which the present invention is applied.

As shown in FIG. 6, the display unit 1 has 8 cells in a horizontal direction and 3 cells in a vertical direction, and is thus formed by a total of 24 cells, for example. Incidentally, the horizontal direction is set to be an x-direction and the vertical direction is set to be a y-direction.

The display unit sets the cell information by setting a cell at the uppermost and leftmost position (x=1, y=1) as a cell 1 and setting a cell at the lowermost and rightmost position (x=8, y=3) as a cell 24, for example.

"Display unit 1-cell 1" indicates the position of the cell 1 (x=1, y=1) in the display unit 1 (X=1, Y=1) of the screen unit 13.

Information of each of the display units and cells is set in the same manner as described above to generate screen information in conjunction with the above-mentioned additional data.

The screen unit 13 may supply the screen information directly to the adjusting unit 17 via the video processing unit 12, or may supply the screen information to the video processing unit 12 so that the screen information is supplied to the adjusting unit 17 when requested by the adjusting unit 17. Also, the screen unit 13 may supply the screen information directly to the abnormality signal detecting unit 18 via the video processing unit 12, or may supply the screen information to the video processing unit 12 so that the screen information is supplied to the abnormality signal detecting unit 18 when requested by the abnormality signal detecting unit 18. Incidentally, a model number of a screen connected in advance to the video processing unit 12 may be set so as to obtain information of display units and cells forming the screen in correspondence with the model number.

The power unit 14 supplies power to the screen unit 13.

The video capturing unit 15 is for example a video capture board, which is an expansion board having a function of digitizing video images from a video camera or a videocassette recorder and feeding the video images to a computer.

The video capturing unit 15 is supplied with the post-processing video signal from the video signal output terminal $a12$ provided to the video processing unit 12. The video capturing unit 15 generates a post-conversion video signal by converting the post-processing video signal into a video signal suitable for the control and monitoring unit 16. Then, the video capturing unit 15 supplies the post-conversion video signal to the control and monitoring unit 16.

The control and monitoring unit 16 is connected to the video signal selecting unit 11 via the signal line A to select a video signal by means of the video signal selecting unit 11. The control and monitoring unit 16 is also connected to the video processing unit 12 via the signal line C, and controls video processing by the video processing unit 12 so as to adjust the size, display position and the like of a display image being displayed and thereby obtain a specified display form. The control and monitoring unit 16 also controls a schedule of video signals from the video signal selecting unit 11 via the signal line A. Furthermore, the control and monitoring unit 16 is supplied with the foregoing screen information from the video processing unit 12 via the signal line C.

In addition, the control and monitoring unit 16 is supplied with the post-conversion video signal resulting from conversion by the video capturing unit 15.

The adjusting unit 17 is for example a personal computer apparatus (hereinafter referred to as a PC), comprising: a storage means such as a hard disk or a memory for storing data and programs necessary for processing; a CPU (Central Processing Unit) for carrying out arithmetic processing on data received via a communication line and data received from the storage means; and a display unit for displaying a result of the arithmetic processing on a CRT display or the like. The PC also has a keyboard as an input means, a mouse pointer as a selecting means and the like, and operates under an OS (Operating System) environment adopting a GUI (Graphical User Interface). The adjusting unit 17 is supplied with the screen information from the video processing unit 12 via the signal line D.

Figure 7:
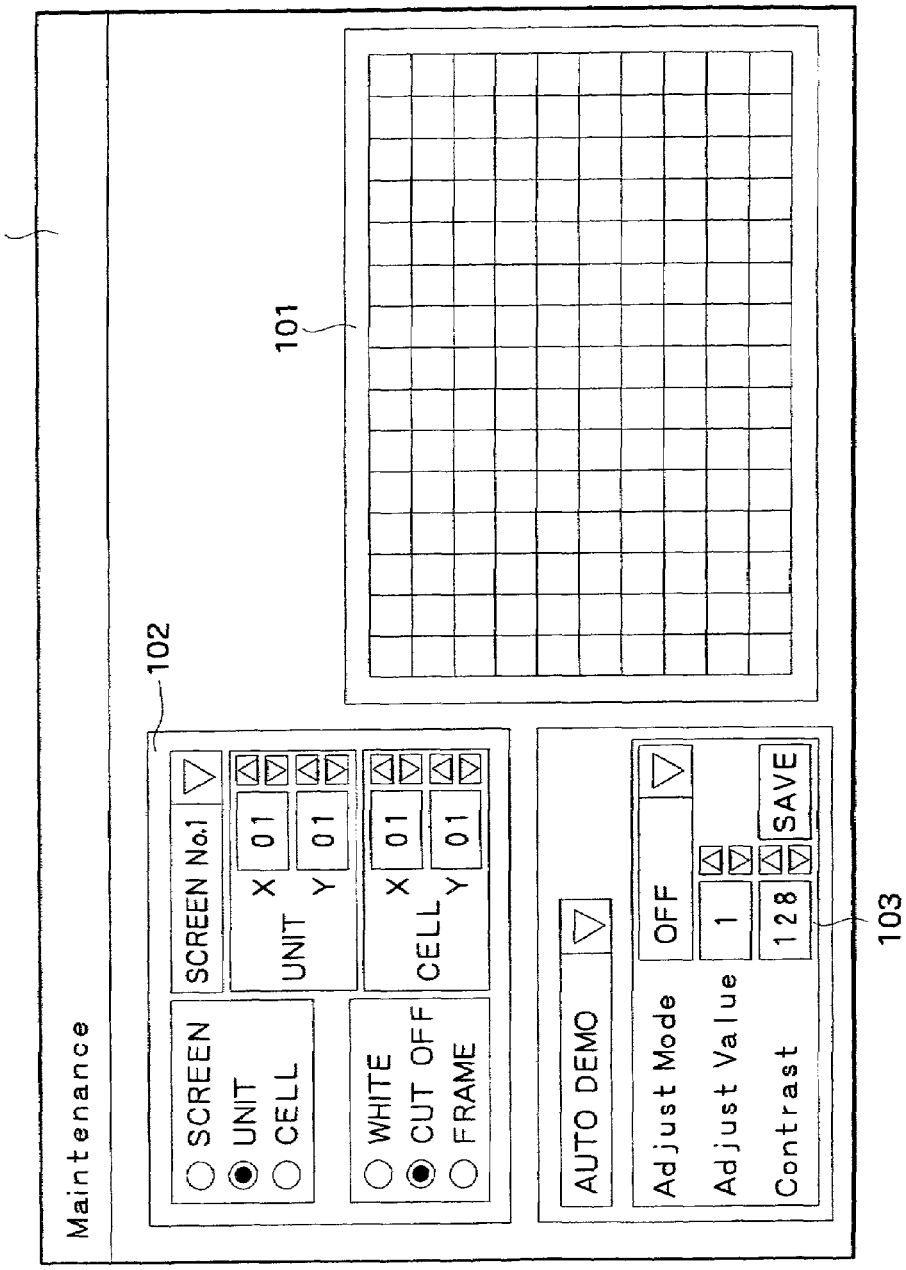
FIG. 7 shows a GUI of a maintenance window for adjusting the screen unit provided in the display system.
Figure 8:
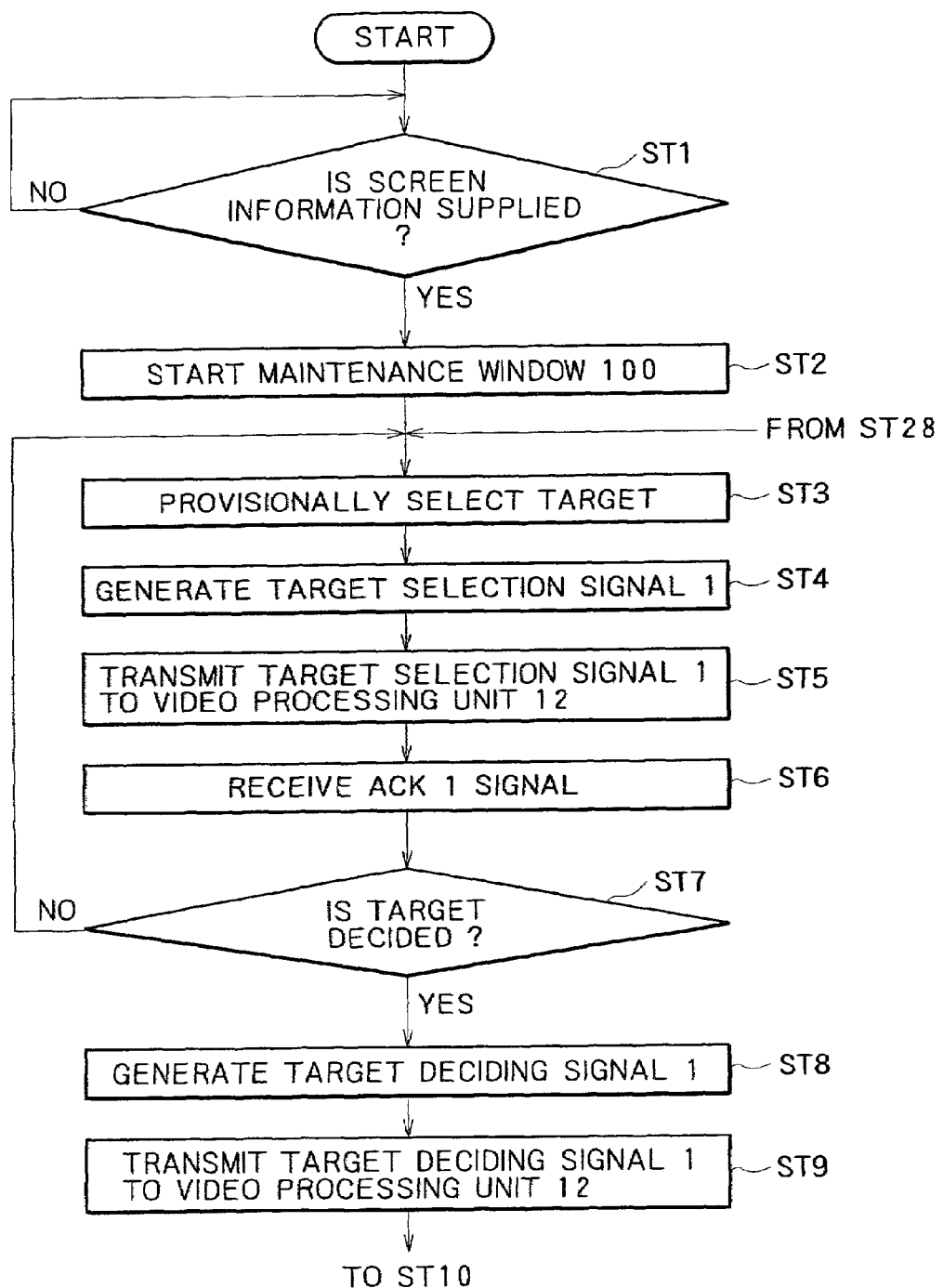
FIG. 8 is a first flowchart illustrating an example of operation of an adjusting unit provided in the display system.

Operation of the adjusting unit 17 will be described in the following. A maintenance window 100 shown in FIG. 7 is displayed on the display unit of the adjusting unit 17 by an application program shown by a GUI which program is loaded from the storage means such as a hard disk and executed by the CPU, and visually shows screen information and the like of the screen unit 13 of the display system 1. The maintenance window 100 selects a display unit or a cell as a target, and makes adjustment of the selected display unit or cell.

The maintenance window 100 has a pseudo screen window 101, a target selecting window 102, and an action window 103.

The pseudo screen window 101 is a display unit that schematically displays the screen unit 13 according to the screen information. The display size of the pseudo screen window 101 may be enlarged or reduced for ease of operation according to circumstances.

The target selecting window 102 displays the type of the display unit or cell (hereinafter referred to as the target) selected in the pseudo screen window 101, screen mode when the target is selected, and a screen number and/or display unit information and/or cell information.

The action window 103 makes adjustment of the target selected in the pseudo screen window 101.

Similarly to the adjusting unit 17, the abnormality signal detecting unit 18 is for example a personal computer apparatus (hereinafter referred to as a PC), including: a storage means such as a hard disk or a memory for storing data and programs necessary for processing; a CPU (Central Processing Unit) for carrying out arithmetic processing on data received via a communication line and data received from the storage means; and a display unit for displaying a result of the arithmetic processing on a CRT display or the like. The PC also has a keyboard as an input means, a mouse pointer as a selecting means and the like, and operates under an OS (Operating System) environment adopting a GUI (Graphical User Interface). The abnormality signal detecting unit 18 is supplied with the screen information from the video processing unit 12 via the signal line E.

The network connecting unit 19 is for example a modem for connecting the display system 1 to the Internet.

The network 20 is for example the Internet. The network 20 is connected to the control and monitoring unit 16, the adjusting unit 17, and the abnormality signal detecting unit 18 via the network connecting unit 19, and also connected to a plurality of information terminals 21 via a connecting apparatus such as a modem. An information terminal 21 can control and monitor video signal selecting information, video processing control information, display schedule control information, the screen information of the screen unit 13, post-conversion video signal data and the like as described above via the network 20.

The display system 1 also includes an audio signal unit including: an audio signal input unit for being supplied with an audio signal corresponding to the video signal of the screen unit 13 and outputting the audio signal; an audio signal processing unit for carrying out signal processing and the like on the audio signal inputted thereto; and an audio signal output unit for outputting the audio signal after the processing.

The screen unit provided for the display system 1 has correction data for each of the display units or each of the cells. The screen unit operates so as to obtain required uniformity on the basis of the correction data. In actuality, however, the screen unit has a display unit and/or a cell of poor uniformity because of lack of adjustment. Thus, the adjusting unit 17 makes adjustment so that the screen unit may obtain required uniformity.

Operation for adjusting a display unit and a cell by the adjusting unit 17 when a display unit is replaced for maintenance or because of a defect or the like will be described in the following with reference to flowcharts shown in FIGS. 8 to 12.

At a step ST1, the adjusting unit 17 determines whether or not screen information is supplied via the video processing unit 12 shown in FIG. 1. When the adjusting unit 17 determines that the screen information has been supplied to the adjusting unit 17, the processing proceeds to a step ST2.

At the step ST2, the adjusting unit 17 starts the maintenance window 100 in response to the screen information.

At a step ST3, the adjusting unit 17 makes provisional selection of a given display unit as a target by using the pseudo screen window 101 provided in the maintenance window 100.

Target selecting operation using the pseudo screen window 101 will be described in the following with reference to FIG. 7.

The adjusting unit 17 selects a target by a click of a given display unit in the pseudo screen window 101 displayed in the maintenance window 100 shown in FIG. 7 by means of a mouse, for example. The target selection may be made by methods other than that described above.

At a step ST4, the adjusting unit 17 generates a target selection signal 1 shown in FIG. 13 in response to the operation of the provisional selection of the target at the step ST3.

SID 1 shown in FIG. 13 is a transmitting source display unit ID, that is, the SID 1 indicates an ID number of an apparatus acting as a transmitting source. When the transmitting side is a PC, an ID number assigned to the PC is inputted to the SID 1. DID 1 is a receiving display unit ID, that is, the DID 1 indicates an ID number of an apparatus acting as a receiver. When the receiving side is a processor, an ID number assigned to the processor is inputted to the DID 1. "Reserved" indicates a dummy of 0×20 (fixed). SID 2 indicates a transmitting source procedure ID, that is, an ID number of a procedure of the transmitting source. The transmitting source is provided with several procedures (program functions) for intended processes, and the procedures are each assigned a number. An ID number indicating which procedure is used for processing by the transmitting source is inputted to the SID 2. DID 2 indicates a receiving procedure ID, that is, a procedure ID of the receiver. The receiver is provided with several procedures (program functions) for intended processes, and the procedures are each assigned a number. An ID number indicating which procedure is used for processing by the receiver is inputted to the DID 2. Information of ACK, NACK, GET, and PUT is inputted to CTRL (control). SIZE indicates message size, and the number of bytes comprising a command is inputted to the SIZE. A portion from SYNC to the SIZE is referred to as a message header.

RC indicates an ID number of a resource. A resource is a program within a procedure. X, Y, and Z each indicate address information of a display unit. Since the screen is formed by an arrangement with display units aligned in a vertical and a horizontal direction, numbers in the arrangement are inputted to the X and Y. The number of screens of a single display system is not limited to one; in the case of a four-sided screen hanged from a ceiling in a gymnasium, for example, the display system is formed by four screens, and therefore an address of a screen is inputted to the Z. Cmd (command) indicates the type of a command. The type of a command such as for adjustment of a target or for displaying a test pattern is inputted to the Cmd. "Mode" indicates execution of a command. For example, when brightness of a target is to be adjusted, an adjustment executive command for adjusting a target, a storage executive command for storing data in the target and the like are inputted to the Mode. ADJ indicates luminous color information. For example, when brightness of a target is to be adjusted, the luminous color information specifies what color is to be adjusted in what background color; for example red is adjusted with a background set to be white. Depending on the Cmd and the Mode, the setting of the ADJ may not be required, and in that case, zero is inputted to the ADJ. LUM indicates brightness information. When brightness of a target is to be adjusted, the brightness of the screen as a whole is specified in the LUM. For example, when the brightness of the screen is low and the screen as a whole lacks uniformity, the brightness of the screen is lowered by the LUM and a non-uniform target is adjusted. Depending on the Cmd and the Mode, the setting of the LUM may not be required, and in that case, zero is inputted to the LUM. "Element" specifies a display unit or a cell as a target element, thereby specifying that the target to be subjected to some adjustment or the like is a display unit or a cell. Information about an address of a cell in an X-direction is inputted to Px, and information about an address of the cell in a Y-direction is inputted to Py. FCS indicates a frame check sequence. A portion from the RC to SYNC is referred to as a message body.

At a step ST5, the adjusting unit 17 transmits the target selection signal 1 generated at the foregoing step ST4 to the video processing unit 12 via the signal line D. The video processing unit 12 transmits a control signal corresponding to the target selection signal 1 transmitted from the adjusting unit 17 to the screen unit 13. The control signal in this case is shown in FIG. 14.

The control signal is generated by converting the message body portion of the target selection signal 1. The control signal has a data structure formed by a combination of non-reversed data and reversed data in order for the receiving side to confirm consistency of a command.

Figure 14:
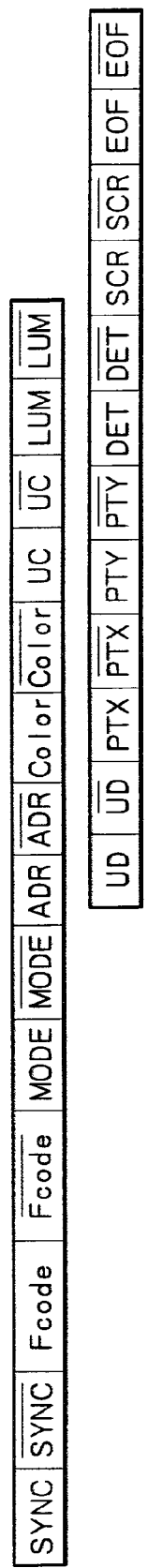
FIG. 14 shows a control signal transmitted from the video processing unit to the screen unit provided in the display system.

F code shown in FIG. 14 indicates a command, and corresponds to the Cmd of the target selection signal 1. MODE indicates a mode for making an appropriate part of the screen unit 13 emit light, and corresponds to the Mode of the target selection signal 1. ADR indicates display unit address information, and corresponds to the X and Y of the target selection signal 1. "Color" indicates luminous color, and corresponds to the ADJ of the target selection signal 1. UCP indicates element specification that specifies a display unit or a cell as a target element, and corresponds to the Element of the target selection signal 1. LUM indicates brightness, and corresponds to the LUM of the target selection signal 1. UD indicates an adjustment value of correction data possessed by a display unit or a cell currently selected by the Element, and corresponds to DATA of the target selection signal 1. PTX indicates a pointer in an X-direction of the screen unit, and corresponds to the Px of the target selection signal 1. PTY indicates the pointer in a Y-direction of the screen unit, and corresponds to the Py of the target selection signal 1. DET indicates a mode when correction data is adjusted by means of a sensor. SCR indicates a screen address, and corresponds to the Z of the target selection signal 1.

In response to the foregoing control signal, the screen unit 13 makes a display unit corresponding to the selection in the pseudo screen window 101 emit light in a blinking manner.

At a step ST6, the adjusting unit 17 receives an ACK 1 signal from the video processing unit 12. The ACK 1 signal is generated by the video processing unit 12 in response to the receiving, by the video processing unit 12, of the target selection signal 1 transmitted by the adjusting unit 17.

At a step ST7, the adjusting unit 17 determines whether or not operation for deciding on the provisionally selected target is to be performed. When the operation for deciding on the target is not to be performed, the adjusting unit 17 returns to the step ST3 to select another display unit. When the operation for deciding on the target is to be performed, the adjusting unit 17 proceeds to a step ST8.

At the step ST8, the adjusting unit 17 generates a target deciding signal 1 according to the operation for deciding on the target. The adjusting unit 17 performs the operation for deciding on the target by pressing a "DECISION" button in the target selecting window 102 provided in the maintenance window 100.

At a step ST9, the adjusting unit 17 transmits the target deciding signal 1 generated at the step ST8 to the video processing unit 12.

Figure 9:
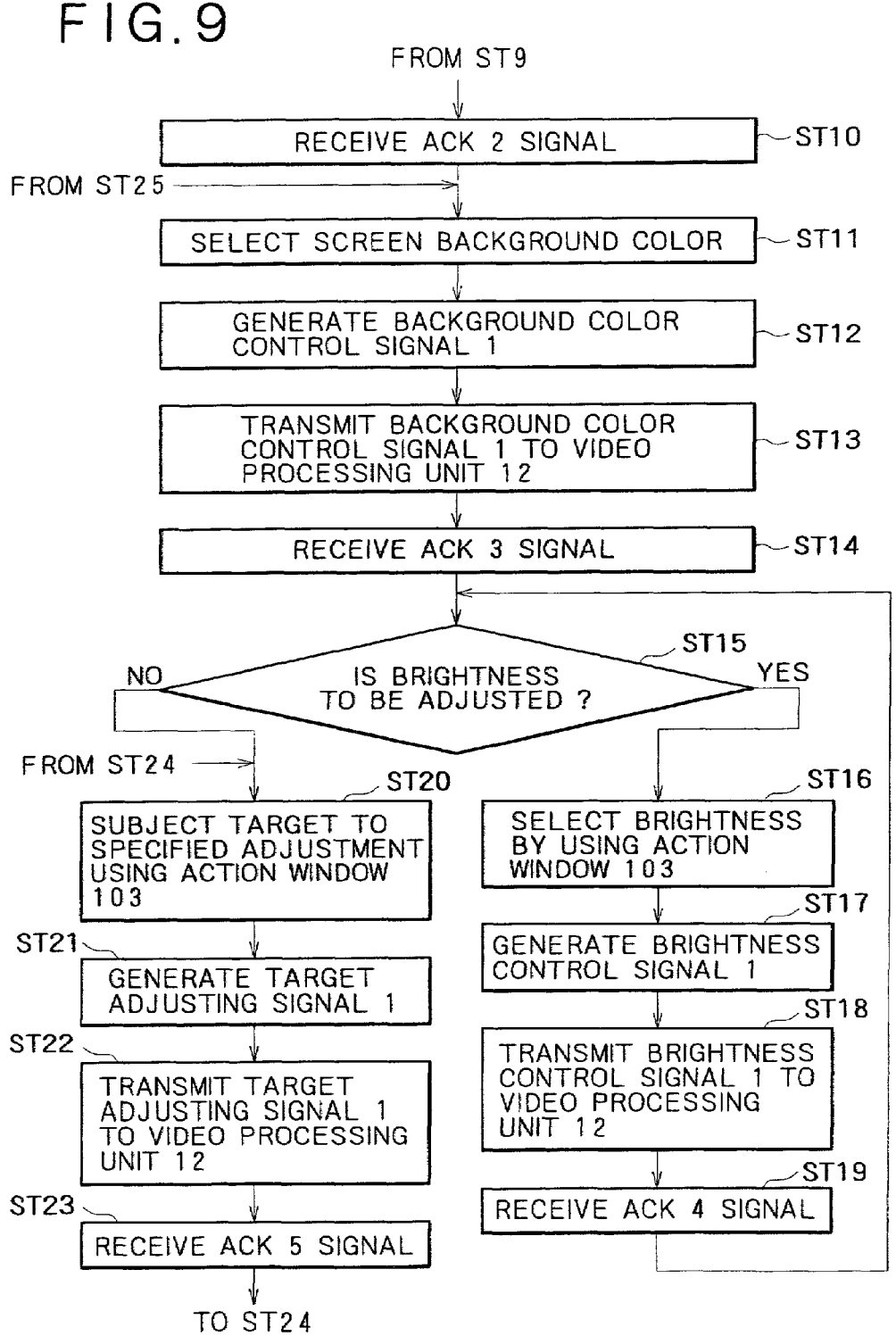
FIG. 9 is a second flowchart illustrating an example of operation of the adjusting unit provided in the display system.

As shown in FIG. 9, at a step ST10, the adjusting unit 17 receives an ACK 2 signal from the video processing unit 12. The ACK 2 signal is generated by the video processing unit 12 in response to the receiving by the video processing unit 12 of the target deciding signal 1 transmitted by the adjusting unit 17. In response to the series of operations for deciding on the target from the step ST8 to the step ST10, the screen unit 13 makes the specified target (display unit) emit totally white light.

The adjusting unit 17 next selects the background color and the brightness of the screen unit 13.

At a step ST11, the adjusting unit 17 selects one of Red, Green, Blue, and White as a background color of the screen unit 13. Incidentally, the White is produced by simultaneous emission of three colors: the Red, the Green, and the Blue. The adjusting unit 17 selects the background color of the screen unit 13 by using the action window 103 provided in the maintenance window 100.

At a step ST12, the adjusting unit 17 generates a background color control signal 1 in response to the selection at the step ST11.

At a step ST13, the adjusting unit 17 transmits the background color control signal 1 generated at the step ST12 to the video processing unit 12 via the signal line D. The video processing unit 12 transmits a control signal corresponding to the background color control signal 1 transmitted from the adjusting unit 17 to the screen unit 13. The screen unit 13 emits the background color corresponding to the above control signal.

At a step ST14, the adjusting unit 17 receives an ACK 3 signal from the video processing unit 12. The ACK 3 signal is generated by the video processing unit 12 in response to the receiving, by the video processing unit 12, of the background color control signal 1 transmitted by the adjusting unit 17.

At a step ST15, the adjusting unit 17 determines whether or not brightness is to be adjusted. When the adjusting unit 17 determines that brightness is not to be adjusted, the adjusting unit 17 proceeds to a step ST20. When the adjusting unit 17 determines that brightness is to be adjusted, the adjusting unit 17 proceeds to a step ST16.

At the step ST16, the adjusting unit 17 selects the brightness of the screen unit 13 by using the action window 103 provided in the maintenance window 100.

At a step ST17, the adjusting unit 17 generates a brightness control signal 1 in response to the selection at the step ST16.

At a step ST18, the adjusting unit 17 transmits the brightness control signal 1 generated at the step ST17 to the video processing unit 12 via the signal line D. The video processing unit 12 transmits a control signal corresponding to the brightness control signal 1 transmitted from the adjusting unit 17 to the screen unit 13. The screen unit 13 emits light at a brightness corresponding to the above control signal.

At a step ST19, the adjusting unit 17 receives an ACK 4 signal from the video processing unit 12. The ACK 4 signal is generated by the video processing unit 12 in response to the receiving, by the video processing unit 12, of the brightness control signal 1 transmitted by the adjusting unit 17. After the series of operations for adjusting the brightness of the screen from the step ST16 to the step ST19, the adjusting unit 17 returns to the step ST15 to determine whether or not the brightness of the screen is to be adjusted again.

Next, the adjusting unit 17 adjusts the selected target (display unit).

At a step ST20, the adjusting unit 17 subjects the selected target to specified adjustment. The adjusting unit 17 adjusts the target using the action window 103 provided in the maintenance window 100.

At a step ST21, the adjusting unit 17 generates a target adjusting signal 1 in response to the adjustment operation at the step ST20.

At a step ST22, the adjusting unit 17 transmits the target adjusting signal 1 generated at the step ST21 to the video processing unit 12 via the signal line D. The video processing unit 12 transmits a control signal corresponding to the target adjusting signal 1 transmitted from the adjusting unit 17 to the screen unit 13. The screen unit 13 subjects the display unit selected as the target to specified adjustment according to the above control signal.

At a step ST23, the adjusting unit 17 receives an ACK 5 signal from the video processing unit 12. The ACK 5 signal is generated by the video processing unit 12 in response to the receiving, by the video processing unit 12, of the target adjusting signal 1 transmitted by the adjusting unit 17.

Figure 10:
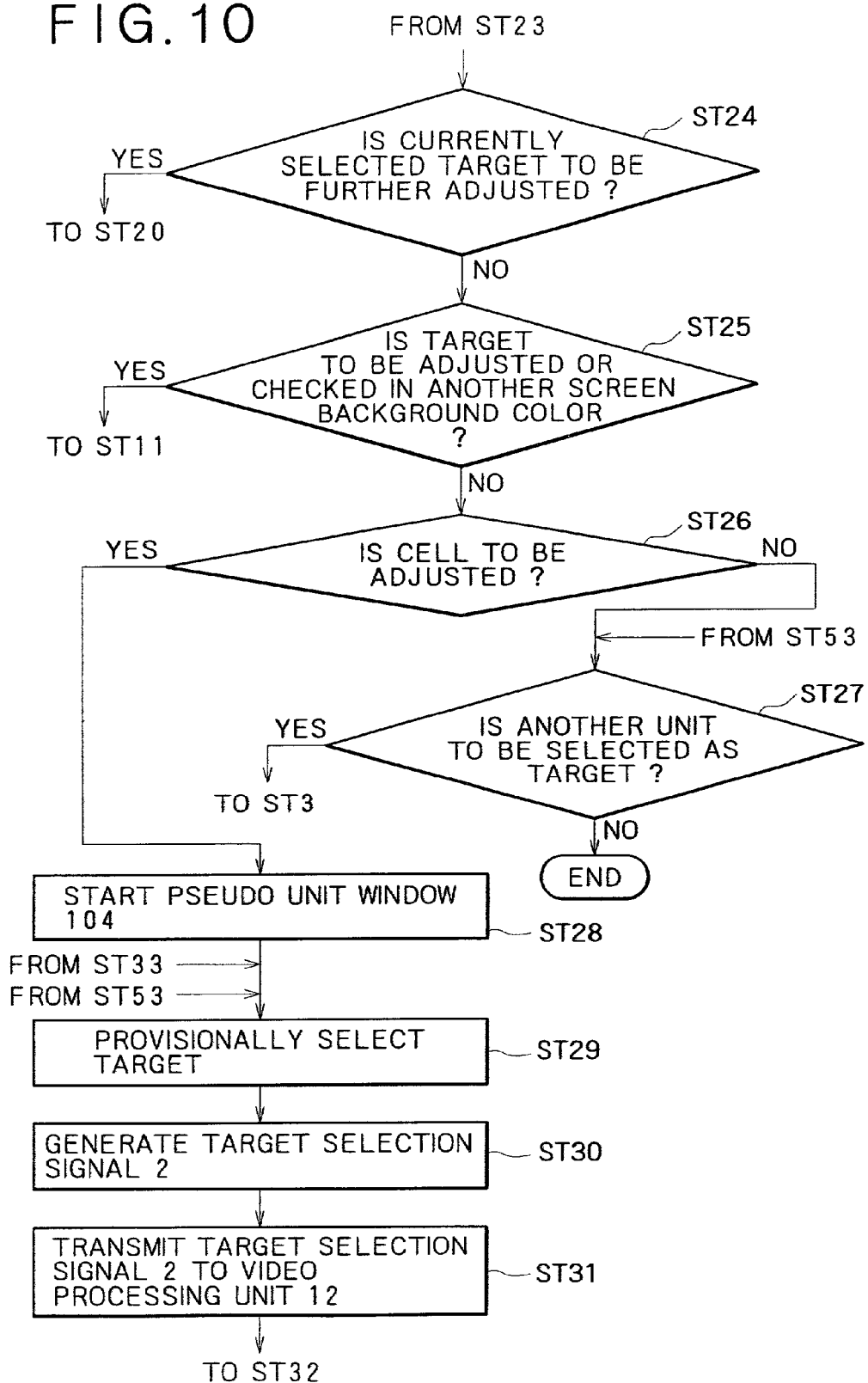
FIG. 10 is a third flowchart illustrating an example of operation of the adjusting unit provided in the display system.

At a step ST24, the adjusting unit 17 displays the adjusted target in the pseudo screen window 101 provided in the maintenance window 100 in response to the receiving of the ACK 5 signal, and then determines whether or not the current target is to be adjusted, as shown in FIG. 10. When the current target is to be adjusted, the adjusting unit 17 returns to the step ST20 shown in FIG. 9 to repeat the steps ST20 to ST24. When the current target is not to be adjusted, the adjusting unit 17 proceeds to a step ST25.

At the step ST25, the adjusting unit 17 determines whether or not the target is to be adjusted and checked in another screen background color (Red, Green, Blue, or White). When the target is to be adjusted and checked in another screen background color, the adjusting unit 17 returns to the step ST11 shown in FIG. 9 to repeat the steps ST11 to ST24. Incidentally, the screen background colors are selected in no particular order. When the target is not to be adjusted and checked in another screen background color, the adjusting unit 17 proceeds to a step ST26.

At the step ST26, the adjusting unit 17 determines whether or not a cell forming the currently selected target is to be adjusted. When a cell forming the currently selected target is to be adjusted, the adjusting unit 17 proceeds to a step ST28. When a cell forming the currently selected target is not to be adjusted, the adjusting unit 17 proceeds to a step ST27.

At the step ST27, the adjusting unit 17 determines whether or not another display unit than the currently selected display unit is to be selected as a target. When another display unit than the currently selected display unit is to be selected as a target, the adjusting unit 17 returns to the step ST3 shown in FIG. 8 to repeat the steps ST3 to ST25.

Figure 15:
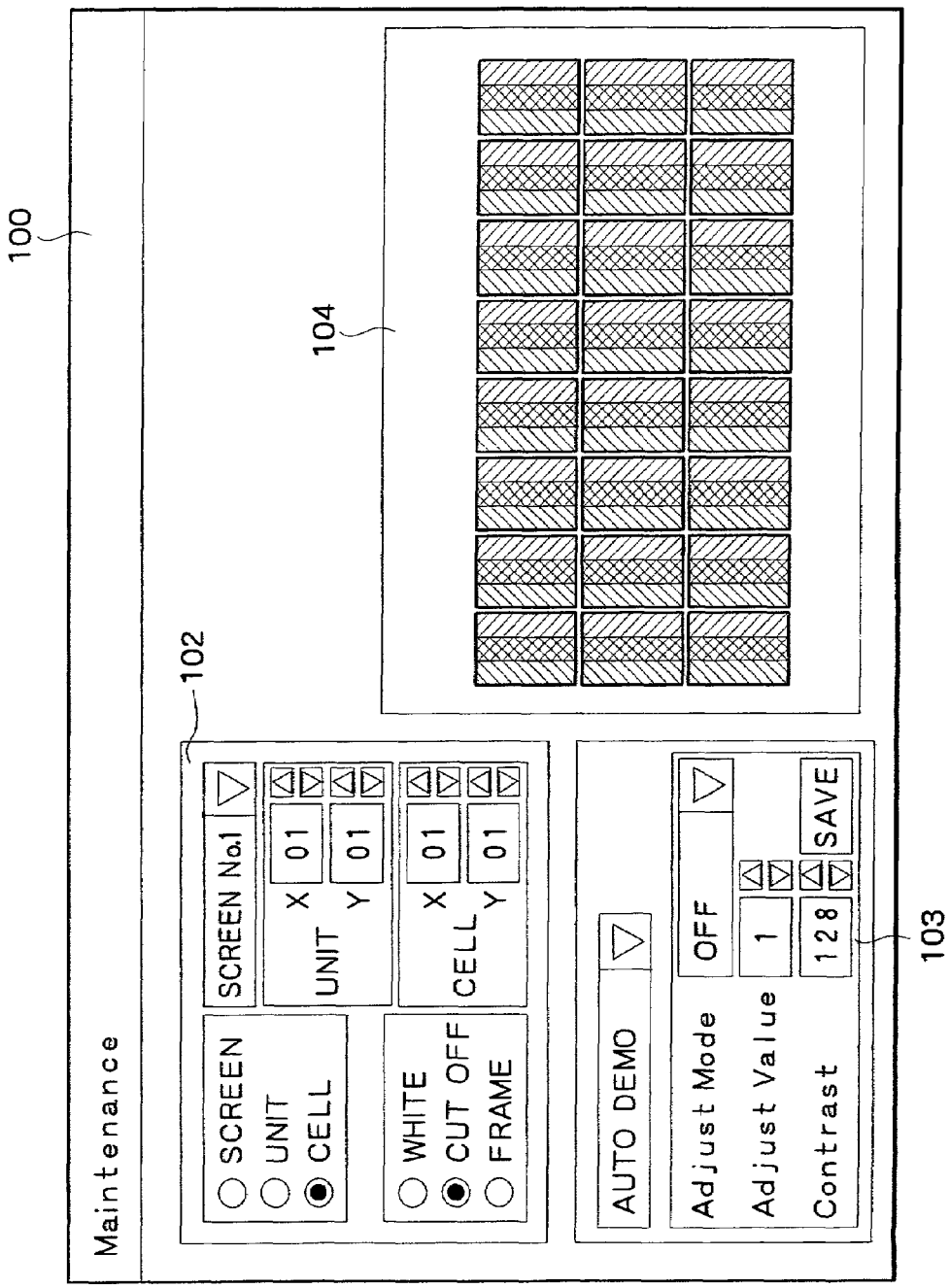
FIG. 15 shows a GUI of a pseudo display unit window for selecting a given cell as a target from a plurality of cells forming a display unit of the screen unit by means of the adjusting unit provided in the display system.

Operation of selecting a target using a pseudo display unit window 104 will be described in the following with reference to FIG. 15.

At a step ST28, the adjusting unit 17 starts the pseudo display unit window 104 enabling the operation of selecting a cell. For example, the target currently selected in the pseudo screen window 101 provided in the maintenance window 100 shown in FIG. 7 is double-clicked by means of a mouse to display the arrangement of cells forming the target. This represents switching by operation of the mouse from the pseudo screen window 101 to the pseudo display unit window 104 shown in FIG. 15. The above operation starts the pseudo display unit window 104. Incidentally, the pseudo display unit window 104 may be started by methods other than that described above.

At a step ST29, the adjusting unit 17 makes provisional selection of a given cell as a target by using the pseudo display unit window 104 to which switching is made by the operation of the mouse from the pseudo screen window 101 provided in the maintenance window 100.

At a step ST30, the adjusting unit 17 generates a target selection signal 2 in response to the provisional selection of the target at the step ST29.

At a step ST31, the adjusting unit 17 transmits the target selection signal 2 generated at the step ST30 to the video processing unit 12 via the signal line D. The video processing unit 12 transmits a control signal corresponding to the target selection signal 2 transmitted from the adjusting unit 17 to the screen unit 13. In response to the target selection signal 2, the screen unit 13 makes the cell corresponding to the selection in the pseudo display unit window 104 emit light in a blinking manner so that the cell becomes distinguishable.

Figure 11:
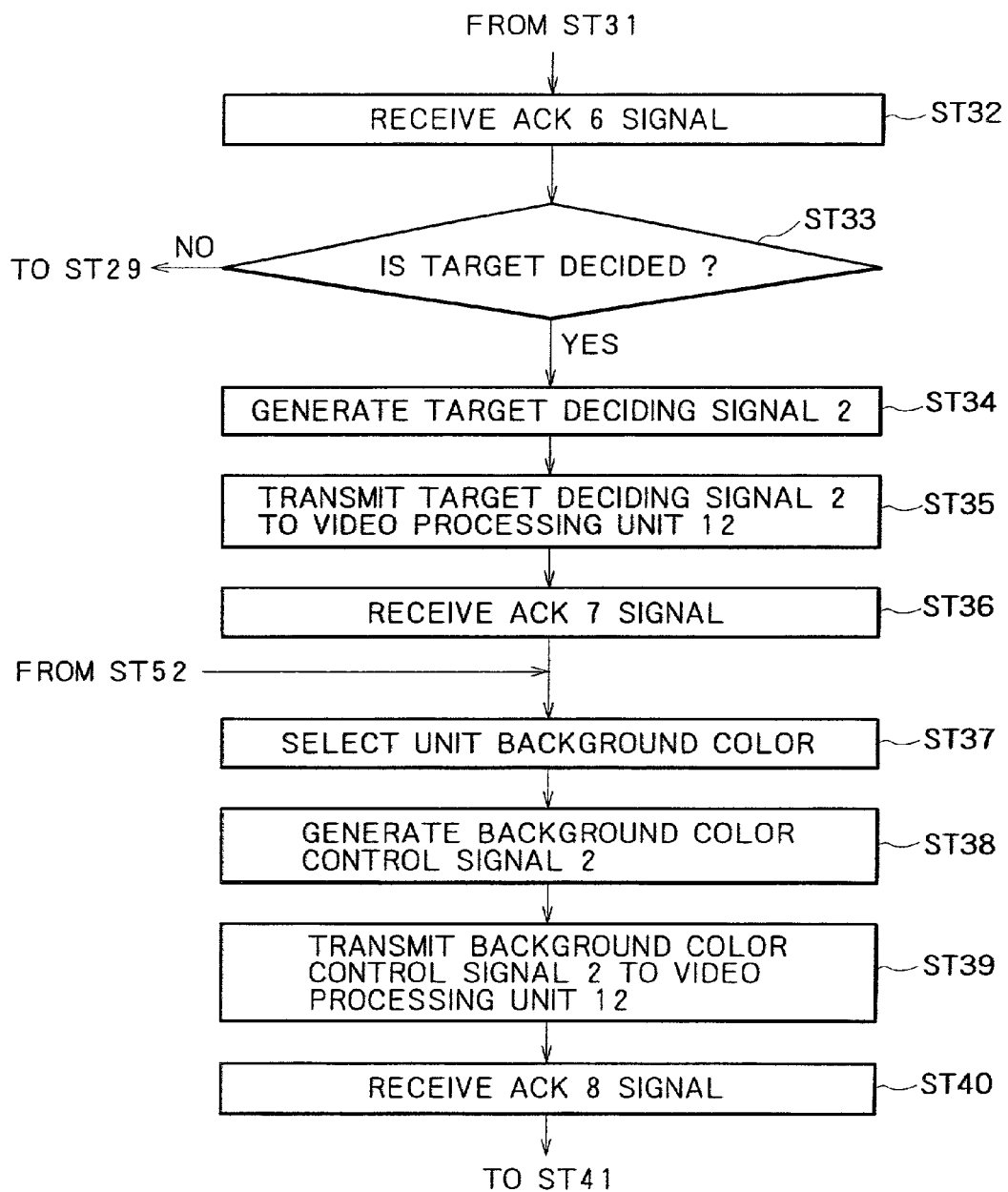
FIG. 11 is a fourth flowchart illustrating an example of operation of the adjusting unit provided in the display system.

At a step ST32, the adjusting unit 17 receives an ACK 6 signal from the video processing unit 12, as shown in FIG. 11. The ACK 6 signal is generated by the video processing unit 12 in response to the receiving, by the video processing unit 12, of the target selection signal 2 transmitted by the adjusting unit 17.

At a step ST33, the adjusting unit 17 determines whether or not operation for deciding on the provisionally selected target is to be performed or not. When the operation for deciding on the target is not to be performed, the adjusting unit 17 returns to the step ST29 shown in FIG. 10 to select another cell. When the operation for deciding on the target is to be performed, the adjusting unit 17 proceeds to a step ST34.

At the step ST34, the adjusting unit 17 generates a target deciding signal 2 according to the operation for deciding on the target. The adjusting unit 17 performs the operation for deciding on the target by pressing a "DECISION" button in the target selecting window 102 provided in the maintenance window 100.

At a step ST35, the adjusting unit 17 transmits the target deciding signal 2 generated at the step ST34 to the video processing unit 12.

At a step ST36, the adjusting unit 17 receives an ACK 7 signal from the video processing unit 12. The ACK 7 signal is generated by the video processing unit 12 in response to the receiving, by the video processing unit 12, of the target deciding signal 2 transmitted by the adjusting unit 17. In response to the series of operations for deciding on the target from the step ST34 to the step ST36, the screen unit 13 makes the specified target (cell) emit totally white light.

The adjusting unit 17 next selects the background color and the brightness of the currently selected display unit of the screen unit 13.

At a step ST37, the adjusting unit 17 selects one of Red, Green, Blue, and White as a background color of the display unit. Incidentally, the White is produced by simultaneous emission of three colors: the Red, the Green, and the Blue. The adjusting unit 17 selects the background color of the display unit by using the action window 103 provided in the maintenance window 100.

At a step ST38, the adjusting unit 17 generates a background color control signal 2 in response to the selection at the step ST37.

At a step ST39, the adjusting unit 17 transmits the background color control signal 2 generated at the step ST38 to the video processing unit 12 via the signal line D. The video processing unit 12 transmits a control signal corresponding to the background color control signal 2 transmitted from the adjusting unit 17 to the screen unit 13. The screen unit 13 emits the background color corresponding to the above control signal.

At a step ST40, the adjusting unit 17 receives an ACK 8 signal from the video processing unit 12. The ACK 8 signal is generated by the video processing unit 12 in response to the receiving, by the video processing unit 12, of the background color control signal 2 transmitted by the adjusting unit 17.

Figure 12:
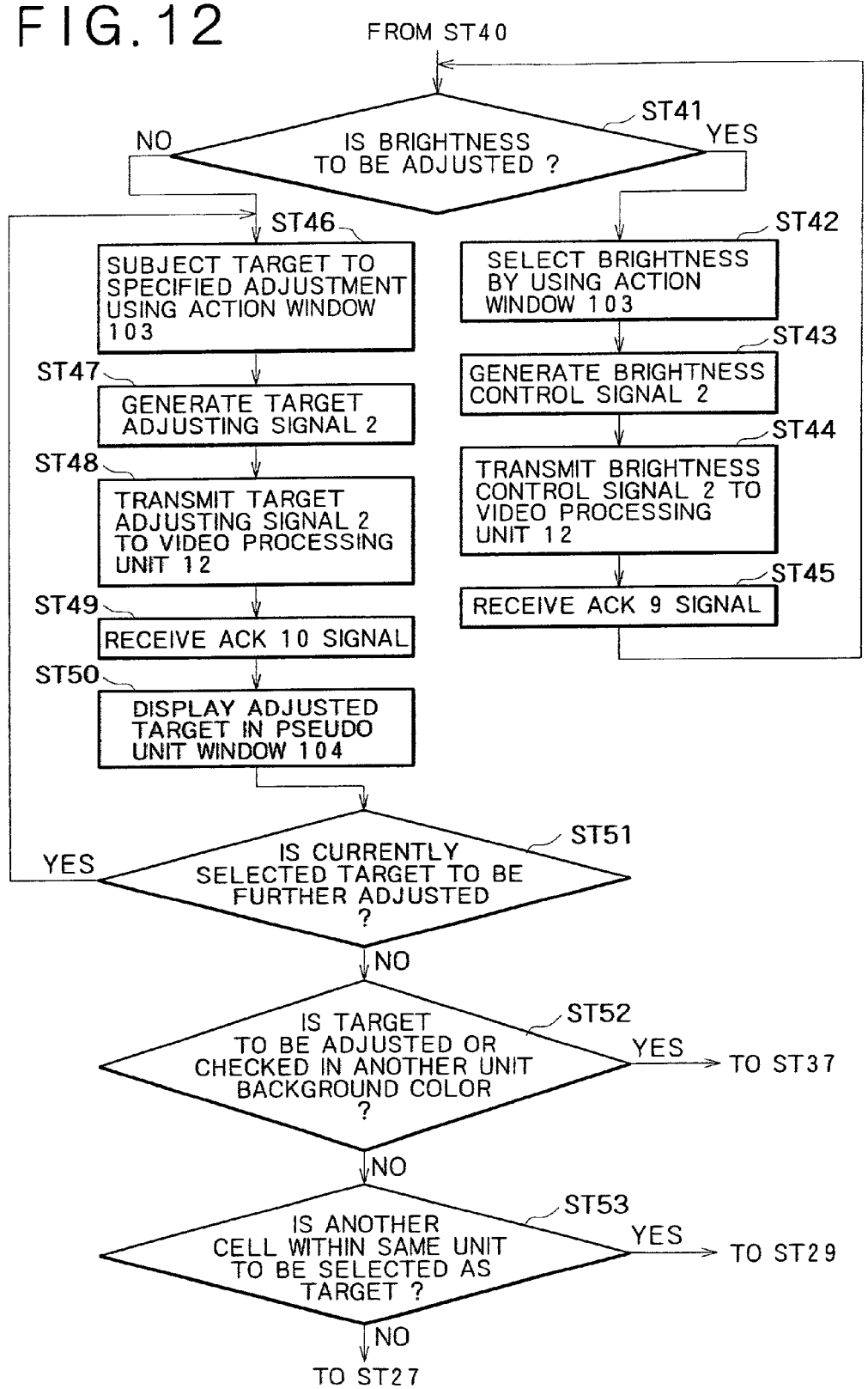
FIG. 12 is a fifth flowchart illustrating an example of operation of the adjusting unit provided in the display system.

At a step ST41, the adjusting unit 17 determines whether or not brightness is to be adjusted, as shown in FIG. 12. When the adjusting unit 17 determines that brightness is not to be adjusted, the adjusting unit 17 proceeds to a step ST46. When the adjusting unit 17 determines that brightness is to be adjusted, the adjusting unit 17 proceeds to a step ST42.

At the step ST42, the adjusting unit 17 selects the brightness of the screen unit 13 by using the action window 103 provided in the maintenance window 100.

At a step ST43, the adjusting unit 17 generates a brightness control signal 2 in response to the selection at the step ST42.

At a step ST44, the adjusting unit 17 transmits the brightness control signal 2 generated at the step ST43 to the video processing unit 12 via the signal line D. The video processing unit 12 transmits a control signal corresponding to the brightness control signal 2 transmitted from the adjusting unit 17 to the screen unit 13. The screen unit 13 emits light at a brightness corresponding to the above control signal.

At a step ST45, the adjusting unit 17 receives an ACK 9 signal from the video processing unit 12. The ACK 9 signal is generated by the video processing unit 12 in response to the receiving, by the video processing unit 12, of the brightness control signal 2 transmitted by the adjusting unit 17. After the series of operations for adjusting the brightness of the screen from the step ST42 to the step ST45, the adjusting unit 17 returns to the step ST41 to determine whether or not the brightness of the screen is to be adjusted again.

Next, the adjusting unit 17 adjusts the selected target (cell).

At a step ST46, the adjusting unit 17 subjects the selected target to specified adjustment. The adjusting unit 17 adjusts the target using the action window 103 provided in the maintenance window 100.

At a step ST47, the adjusting unit 17 generates a target adjusting signal 2 in response to the adjustment operation at the step ST46.

At a step ST48, the adjusting unit 17 transmits the target adjusting signal 2 generated at the step ST47 to the video processing unit 12 via the signal line D. The video processing unit 12 transmits a control signal corresponding to the target adjusting signal 2 transmitted from the adjusting unit 17 to the screen unit 13. The screen unit 13 subjects the cell selected as the target to specified adjustment according to the above control signal.

At a step ST49, the adjusting unit 17 receives an ACK 10 signal from the video processing unit 12. The ACK 10 signal is generated by the video processing unit 12 in response to the receiving, by the video processing unit 12, of the target adjusting signal 2 transmitted by the adjusting unit 17.

At a step ST50, the adjusting unit 17 displays the adjusted target in the pseudo display unit window 104 provided in the maintenance window 100 in response to the receiving of the ACK 10 signal.

At a step ST51, the adjusting unit 17 determines whether or not the current target is to be further adjusted. When the current target is to be adjusted, the adjusting unit 17 returns to the step ST46 to repeat the steps ST46 to ST50. When the current target is not to be adjusted, the adjusting unit 17 proceeds to a step ST52.

At the step ST52, the adjusting unit 17 determines whether or not the target is to be adjusted and checked in another display unit background color (Red, Green, Blue, or White). When the target is to be adjusted and checked in another display unit background color, the adjusting unit 17 returns to the step ST37 shown in FIG. 11 to repeat the steps ST37 to ST51. Incidentally, the display unit background colors are selected in no particular order. When the target is not to be adjusted and checked in another display unit background color, the adjusting unit 17 proceeds to a step ST53.

At the step ST53, the adjusting unit 17 determines whether or not another cell within the same display unit is to be selected as a target. When another cell within the same display unit is to be selected as a target, the adjusting unit 17 returns to the step ST29 shown in FIG. 10 to repeat the steps ST29 to ST52. When another cell within the same display unit is not to be selected, the adjusting unit 17 returns to the step ST27 shown in FIG. 10.

The adjusting unit 17 may simultaneously select a plurality of display units or cells as targets to collectively adjust the plurality of targets selected by using the action window 103 provided in the maintenance window 100. The above-described operations of the adjusting unit 17 may be programmed and stored on a recording medium. In that case, the recording medium is to be installed in the adjusting unit 17.

Figure 16A:
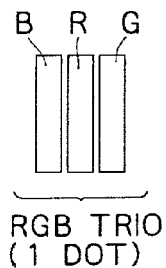
FIGS. 16A, 16B, 16C, and 16D are diagrams showing a structure of the screen unit employing a CRT system.
Figure 16B:
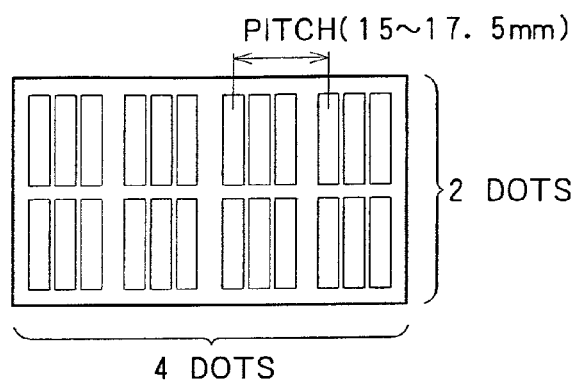
Figure 16C:
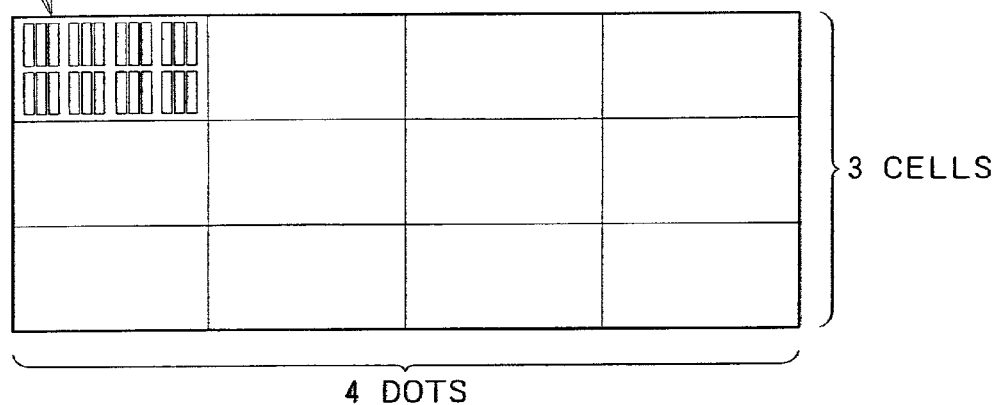
Figure 16D:
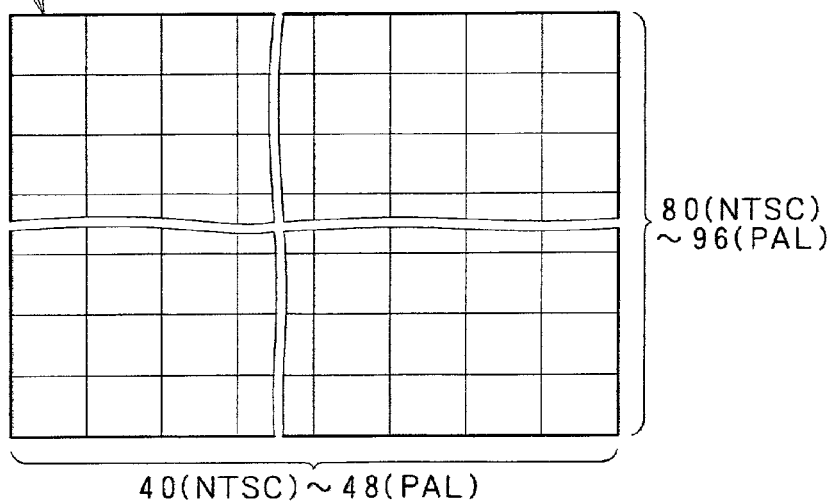
Figure 17A:
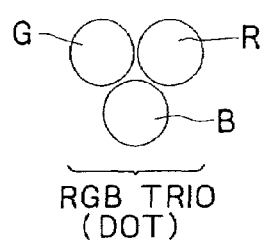
FIGS. 17A, 17B, 17C, and 17D are diagrams showing a structure of the screen unit employing an LED system.
Figure 17B:
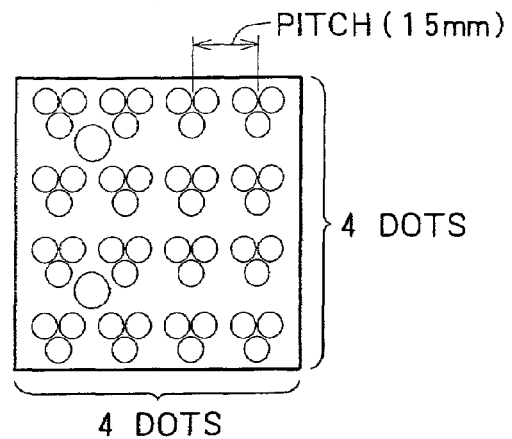
Figure 17C:
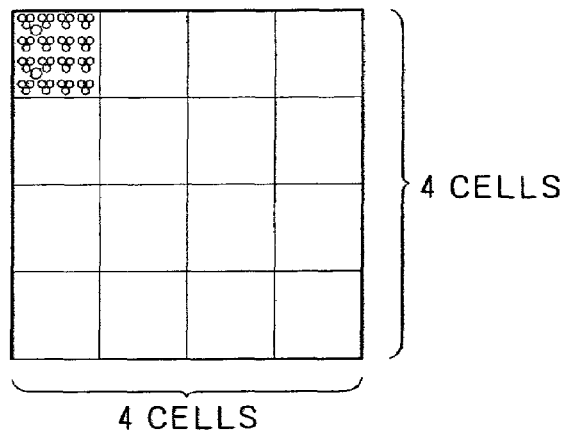
Figure 17D:
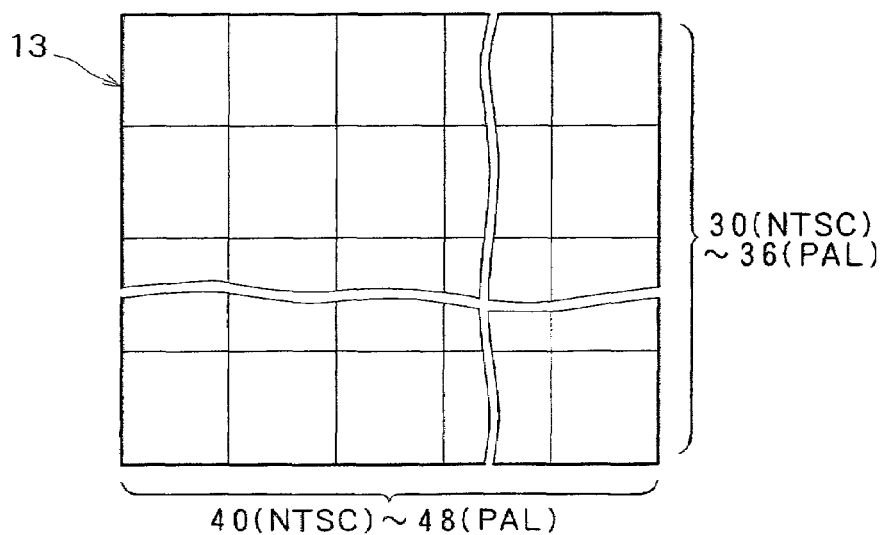

The screen unit 13 may be of a CRT type, as shown in FIGS. 16A to 16D, in which a plurality of emitters of three RGB primary colors arranged at a predetermined pitch (e.g. 15 mm to 17.5 mm) form a single cell (e.g. 4 dots×2 dots), a plurality of such cells form a single display unit (e.g. 4 cells×3 cells), and a plurality of such display units form the screen unit 13 (a maximum of 40 display units×80 display units in the case of NTSC (National Television System Committee) format video signal and a maximum of 48 display units×96 display units in the case of PAL (Phase Alternation by Line) format video signal). Alternatively, the screen unit 13 may be of an LED type, as shown in FIGS. 17A to 17D, in which a plurality of RGB light-emitting diodes (LEDs) arranged at a predetermined pitch form a single cell (e.g. 4 dots×4 dots), a plurality of such cells form a single display unit (e.g. 4 cells×4 cells), and a plurality of such display units form the screen unit 13 (a maximum of 40 display units×30 display units in the case of NTSC and a maximum of 48 display units×36 display units in the case of PAL). The foregoing steps ST1 to ST53 describe an example of the operations for adjusting a display unit and a cell on the assumption that a single cell is formed by a single RGB trio; when a single cell is formed by a plurality of RGB trios as shown in FIG. 16B or FIG. 17B, the adjusting unit 17 selects and adjusts a cell formed by a plurality of RGB trios at the steps ST28 to ST53.

Operation of the abnormality signal detecting unit 18 will next be described. As shown in FIG. 18, an abnormal display unit displaying window 200 displaying a pseudo screen image on the basis of the display unit information generated by the screen unit 13 is displayed on the display unit of the abnormality signal detecting unit 18 by an application program shown by a GUI which program is loaded from a storage means such as a hard disk and executed by a CPU. The abnormal unit displaying window 200 has an abnormal unit information displaying window 201 and a second pseudo screen window 202.

The abnormal display unit displaying window 200 will be described in the following with reference to FIG. 18.

The abnormal unit information displaying window 201 displays display unit number information and display unit position information of a display unit having an abnormality, information describing the nature of the abnormality and the like. The abnormal unit information displaying window 201 displays information in a varied color depending on the nature of the abnormality occurring in the display unit.

The second pseudo screen window 202 displays the display unit having the abnormality. The second pseudo screen window 202 displays the display unit having the abnormality in a different color or in a blinking manner so that normal display units can be distinguished at a glance from the display unit having the abnormality. The second pseudo screen window 202 displays, as an abnormality of a display unit, a temperature abnormality within the display unit, a power abnormality within the display unit, a fan stop of the display unit, an abnormality in communication between the screen unit 13 and the abnormality signal detecting unit 18 or the like.

Operations for replacing a display unit forming the screen unit 13 when an abnormality occurs in the display unit will be described with reference to a flowchart shown in FIG. 19 and FIG. 20.

Figure 19:
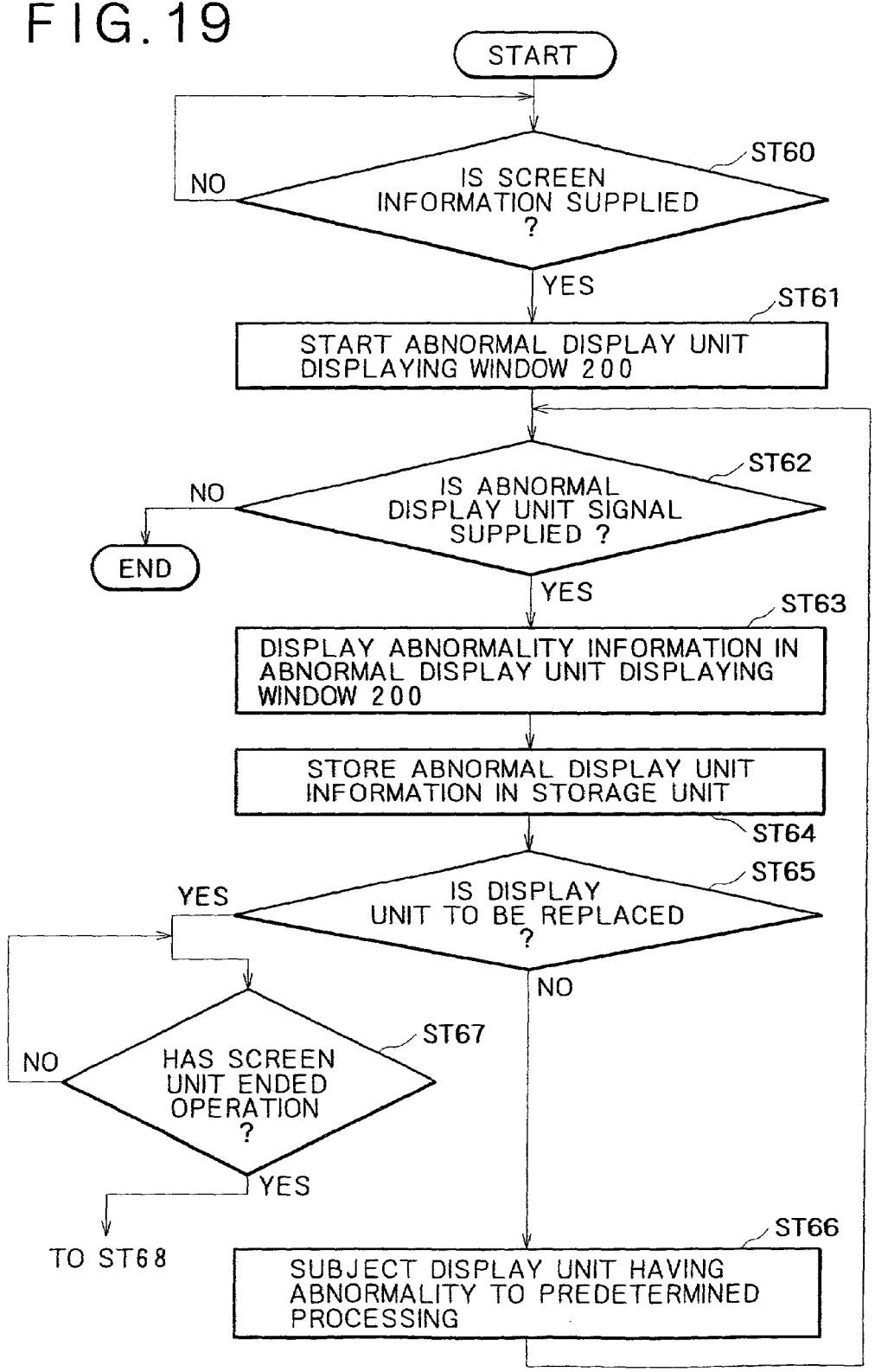
FIG. 19 is a first flowchart illustrating an example of operation for replacing a display unit having an abnormality, when the abnormality occurs in the display unit forming the screen unit, by using the abnormality signal detecting unit to which the present invention is applied.

As shown in FIG. 19, at a step ST60, the abnormality signal detecting unit 18 determines whether or not screen information has been supplied from the screen unit 13. When the screen information has been supplied from the screen unit 13 to the abnormality signal detecting unit 18, the abnormality signal detecting unit 18 proceeds to a step ST61.

At the step ST61, the abnormality signal detecting unit 18 starts the abnormal display unit window 200.

At a step ST62, the abnormality signal detecting unit 18 determines whether or not an abnormal display unit signal has been supplied from the screen unit 13. When an abnormal display unit signal has been supplied from the screen unit 13, the abnormality signal detecting unit 18 proceeds to a step ST63.

At the step ST63, the abnormality signal detecting unit 18 displays display unit information in the abnormal display unit window 200 in response to the abnormal display unit signal.

At a step ST64, the abnormality signal detecting unit 18 stores the abnormal display unit signal in a storage unit. Incidentally, the storage unit provided for the abnormality signal detecting unit 18 may be a volatile memory or a nonvolatile memory.

At a step ST65, the abnormality signal detecting unit 18 determines whether or not the display unit having an abnormality is to be replaced. When the abnormality signal detecting unit 18 determines that the display unit having an abnormality is to be replaced, the abnormality signal detecting unit 18 proceeds to a step ST67. When the abnormality signal detecting unit 18 determines that the display unit having an abnormality is not to be replaced, the abnormality signal detecting unit 18 proceeds to a step ST66.

At the step ST66, the abnormality signal detecting unit 18 subjects the display unit to predetermined processing. After subjecting the display unit having an abnormality to predetermined processing, the abnormality signal detecting unit 18 returns to the step ST62.

At the step ST67, the abnormality signal detecting unit 18 determines whether or not the screen unit 13 has ended normal operation. When the abnormality signal detecting unit 18 determines that the screen unit 13 has ended normal operation, the abnormality signal detecting unit 18 proceeds to a step ST68.

Figure 20:
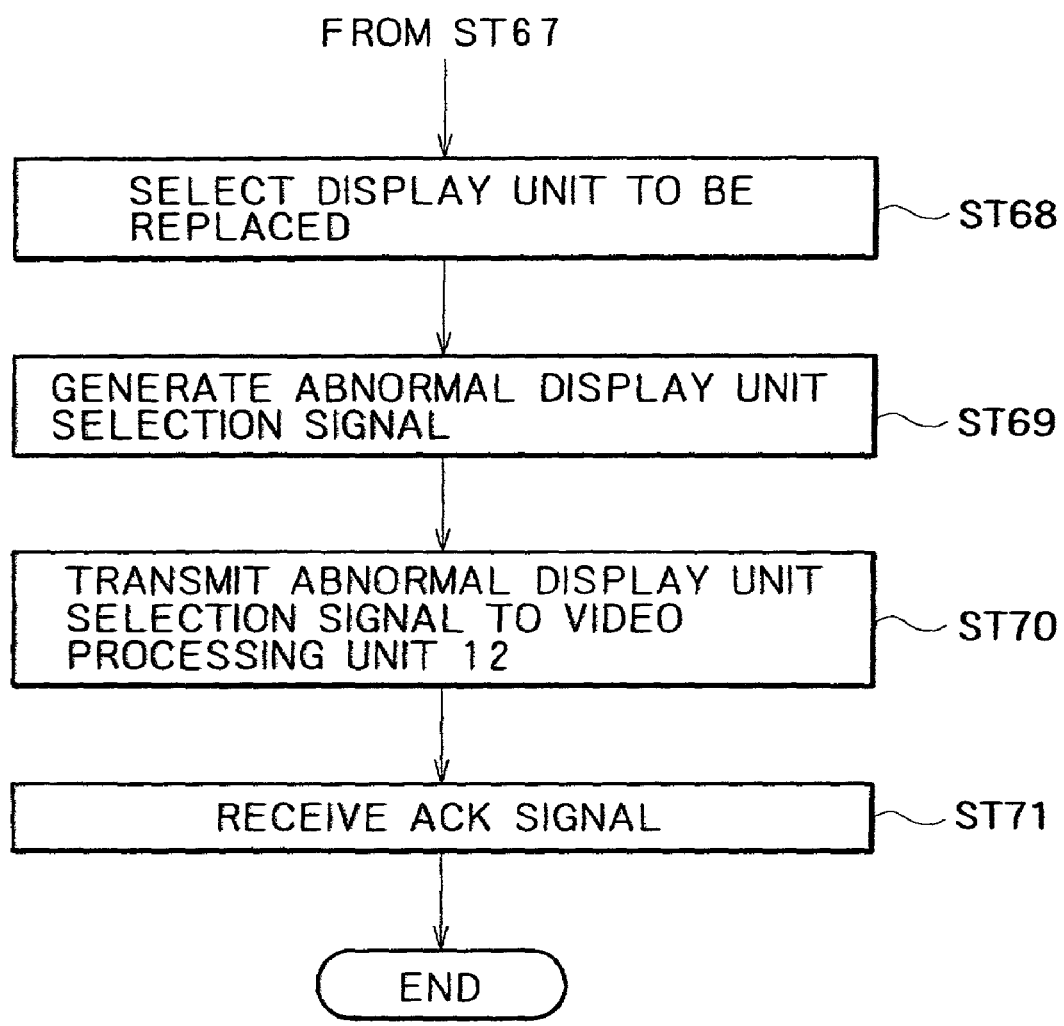
FIG. 20 is a second flowchart illustrating an example of operation for replacing a display unit having an abnormality, when the abnormality occurs in the display unit forming the screen unit, by using the abnormality signal detecting unit to which the present invention is applied.

At the step ST68, as shown in FIG. 20, the abnormality signal detecting unit 18 selects the display unit having an abnormality by using the second pseudo screen window 202 provided in the abnormal display unit window 200.

Operation of selecting the display unit having an abnormality by using the second pseudo screen window 202 will be described with reference to FIG. 18.

The abnormality signal detecting unit 18 selects the display unit having an abnormality by a click of the display unit in the second pseudo screen window 202 displayed in the abnormal display unit window 200 shown in FIG. 18 by means of a mouse, for example. The selection of the display unit having an abnormality may be made by methods other than that described above.

At a step ST69, the abnormality signal detecting unit 18 generates an abnormal display unit selection signal in response to the operation of the selection of the display unit having an abnormality at the step ST68.

At a step ST70, the abnormality signal detecting unit 18 transmits the abnormal display unit selection signal generated at the step ST69 to the video processing unit 12 via the signal line E. The video processing unit 12 transmits a control signal corresponding to the abnormal display unit selection signal transmitted from the abnormality signal detecting unit 18 to the screen unit 13. In response to the control signal, the screen unit 13 lights an LED (Light Emitting Diode) for notifying the abnormality which device is provided in the rear of the display unit corresponding to the selection in the second pseudo screen window 202.

At a step ST71, the abnormality signal detecting unit 18 receives an ACK signal from the video processing unit 12. The ACK signal is generated by the video processing unit 12 in response to the receiving, by the video processing unit 12, of the abnormal display unit selection signal transmitted by the abnormality signal detecting unit 18.

The abnormal display unit displaying window 200 may display a message indicating whether the display unit has been replaced properly after the operation of replacing the display unit. The above-described replacing operations may be programmed and stored on a recording medium. In that case, the recording medium is to be installed in the abnormality signal detecting unit 18.

In addition, the control and monitoring unit 16, the adjusting unit 17, and the abnormality signal detecting unit 18 may be operated by switching from each other on the same apparatus.

Figure 21:
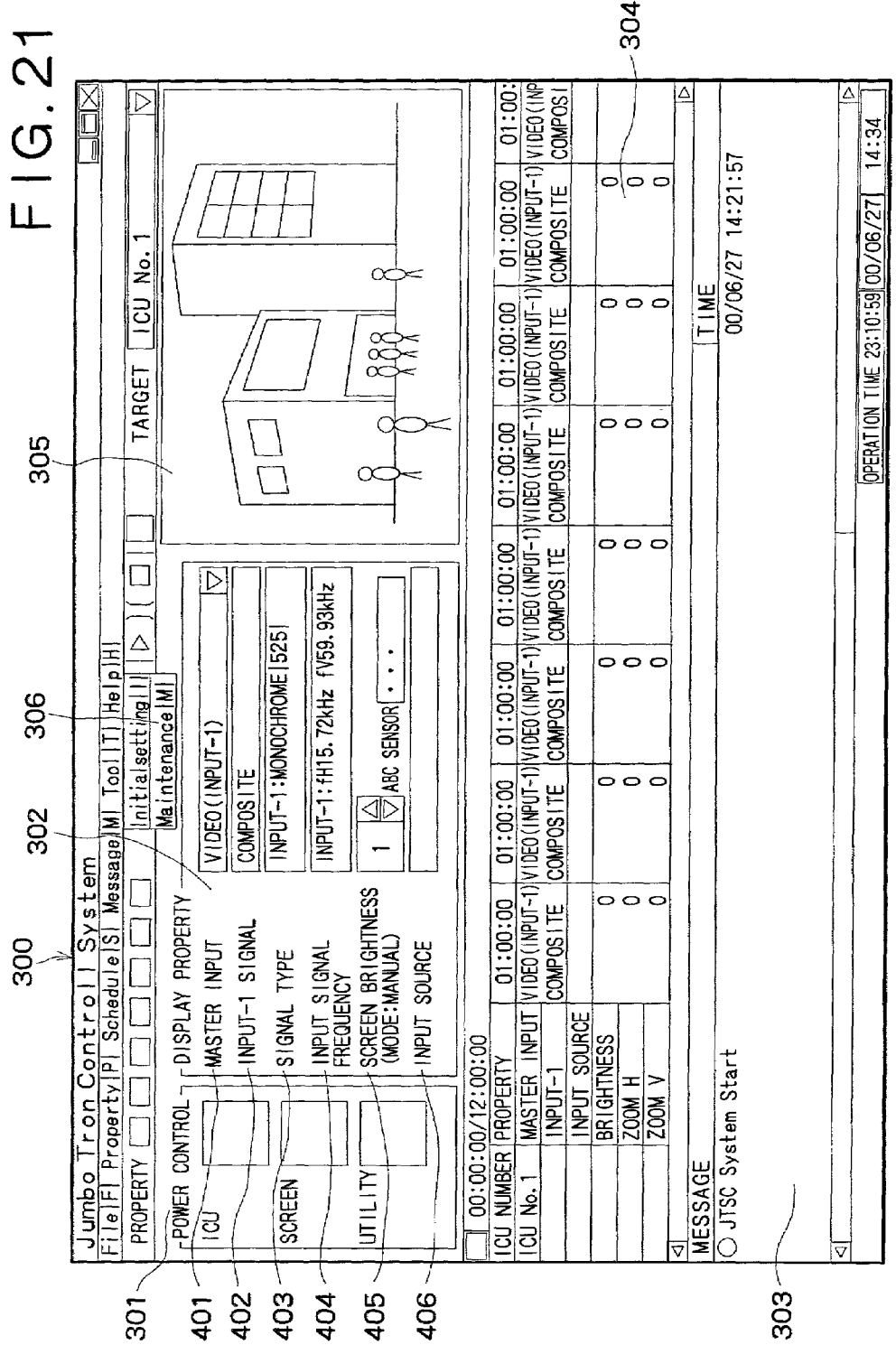
FIG. 21 shows a GUI of a display system information providing window for displaying a state of operation of the display system, a display image displayed on the screen unit, information about the display image and the like for control of the display system.

For example, a display system information providing window 300 that displays a state of operation of the display system 1, a display image displayed on the screen unit 13, information about the display image and the like for control of the display system 1 is provided by an application program shown by a GUI, as shown in FIG. 21. The display system information providing window 300 has a power control portion 301, a display information portion 302, a message portion 303, a schedule portion 304, and an image display portion 305.

The power control portion 301 controls supply of power to apparatus connected to the display system 1, such as the video signal selecting unit 11, the video processing unit 12, and the screen unit 13. The power control portion 301 for example controls supply of power to the power unit 14 to thereby effect on-off control of power to the screen unit 13. Also, the power control portion 301 displays a state of power supply to each of the apparatus.

The display information portion 302 regularly requests video signal information from the video processing unit 12, receives necessary data, and thereby displays the video signal information and a state of operation of the display system 1 in real time. The display information portion 302 may receive the video signal information when the video signal supplied to the video processing unit 12 is changed.

The display information portion 302 further includes an input video signal display portion 401, an input display portion 402, a signal type display portion 403, an input source display portion 406, a screen brightness display portion 405, and an input video signal frequency display portion 404.

The input video signal display portion 401 displays the type of a video signal inputted to the video processing unit 12. When the video signal is inputted from the VCR, for example, the input video signal display portion 401 displays "INPUT-1" or the like in correspondence with the VCR. When the video signal is inputted from the DVD, the input video signal display portion 401 displays "INPUT-2" or the like in correspondence with the DVD.

The input display portion 402 displays a video specification of the video signal inputted to the video processing unit 12. When the video signal is inputted from the VCR to the video processing unit 12, for example, the input display portion 402 displays "COMPOSITE," "RGB" or the like in correspondence with the VCR.

The signal type display portion 403 displays a broadcast system corresponding to the video signal inputted to the video processing unit 12. The signal type display portion 403 displays "NTSC" or "PAL," for example, in correspondence with the video signal inputted to the video processing unit 12.

The input source display portion 406 displays the name of an apparatus that sends the video signal to the video processing unit 12. When the apparatus that sends the video signal to the video processing unit 12 is the DVD, for example, the input source display portion 406 displays "DVD."

The screen brightness display portion 405 displays the brightness of the screen unit 13. The screen brightness display portion 405 indicates the brightness of the screen unit 13 on a scale of one to ten with "5" serving as a standard value, for example, and thus displays a numerical value in a range of "1" to "10."

The input video signal frequency display portion 404 displays horizontal frequency and vertical frequency of the video signal inputted to the video processing unit 12.

The message portion 303 displays error information of the display system 1, the time of receiving the error information and the like. The message portion 303 may also display operating information of the power control portion 301 and the image display portion 305 as distinct from the error information.

The schedule portion 304 carries out file management by combining a display image displayed on the screen unit 13 and operations of adjusting the display position, size, brightness and the like of the display image into one object when performing such adjusting operations in order to obtain a specified display form of the display image. The schedule portion 304 generates a plurality of objects each for an input video signal. The schedule portion 304 also controls a schedule of video signal selection when the video signal selecting unit 11 sequentially selects a plurality of video signals and supplies the video signals to the video processing unit 12.

The image display portion 305 displays the post-conversion video signal supplied from the video capturing unit 15 to the control and monitoring unit 16 as a display image.

Figure 22:
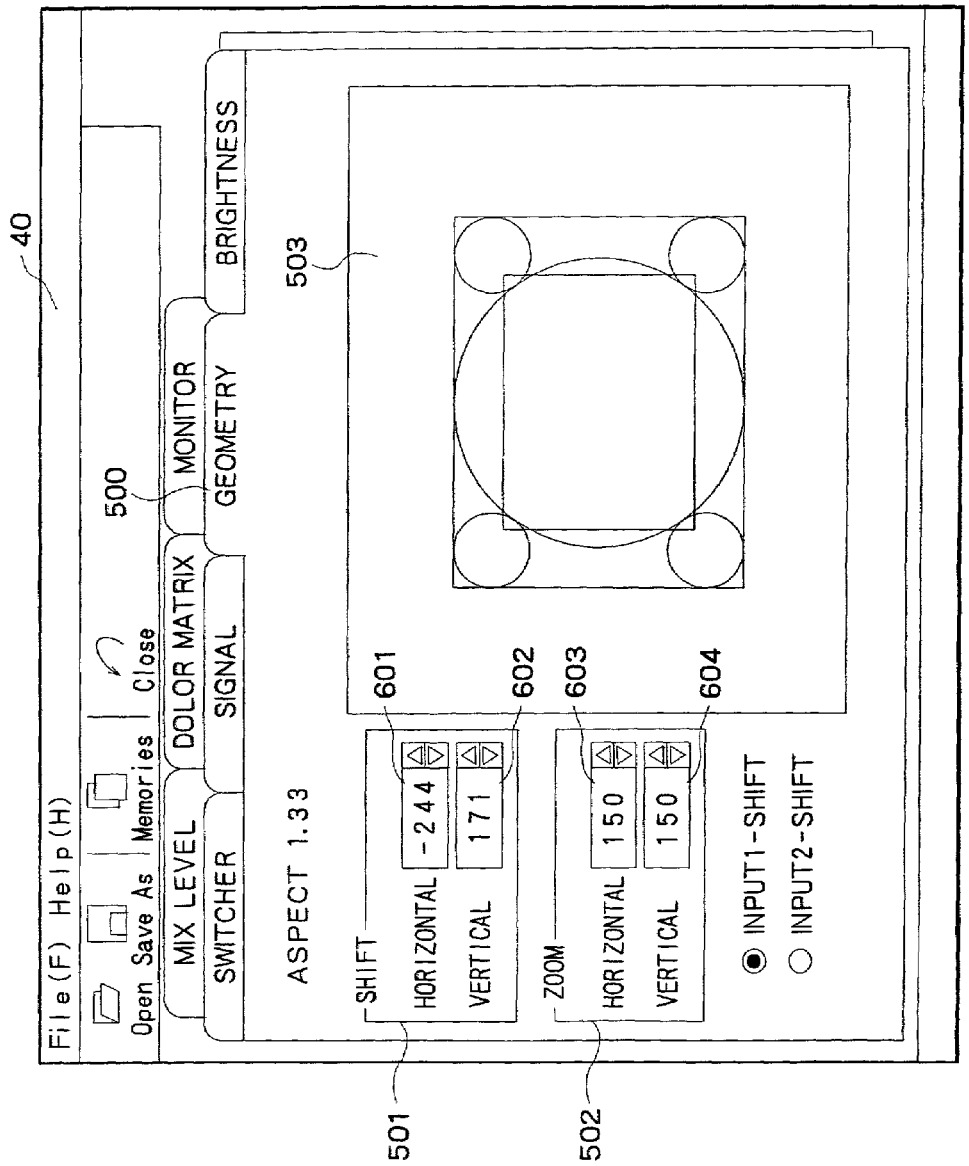
FIG. 22 shows a GUI of a display image adjusting window for adjusting the size and position of a display image displayed on the screen unit provided in the display system.
Figure 23:
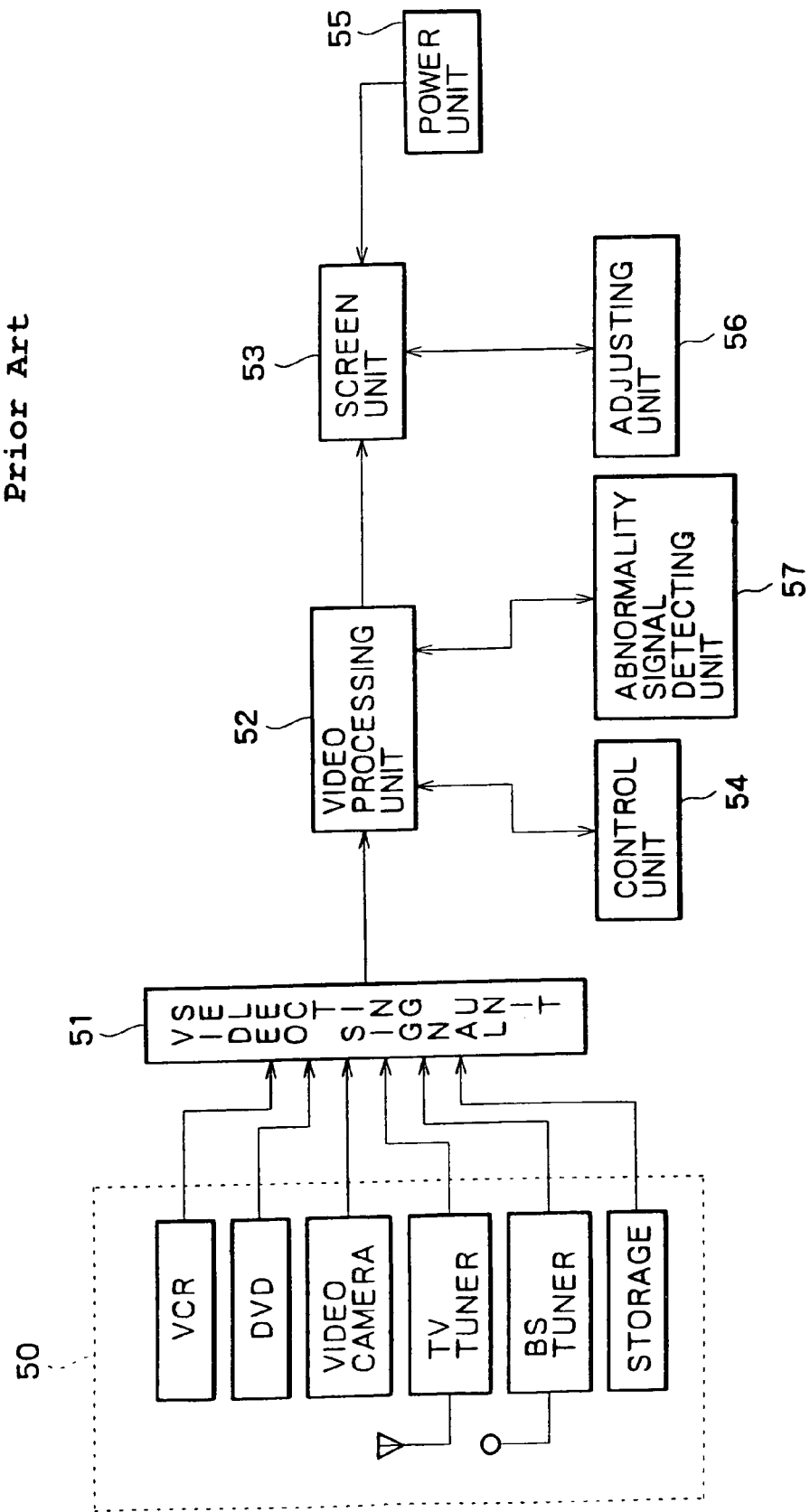
FIG. 23 is a block diagram showing configuration of a conventional display system.

The display image displayed in the image display portion 305 is adjusted in display position, size and the like by a display image adjusting menu 40, which is an application program shown by a GUI, as shown in FIG. 22. The display size of the image display portion 305 may be enlarged or reduced for easy viewing.

The display image adjusting menu 40 has menus such as a geometry 500 for adjusting the display image displayed on the screen unit 13.

The geometry 500 has a position adjusting portion 501, a size adjusting portion 502, and a display image adjusting window 503.

As shown in FIG. 22, the position adjusting portion 501 has a display window that indicates a horizontal position 601 and a vertical position 602 by a numerical value. The position adjusting portion 501 adjusts the position of the display image displayed on the screen unit 13.

The size adjusting portion 502 has a display window that indicates a horizontal position 603 and a vertical position 604 by a numerical value. The size adjusting portion 502 adjusts the size of the display image displayed on the screen unit 13.

The display image adjusting window 503 displays a display image GUI similar to the display image displayed on the screen unit 13 and a display area GUI similar to the display area of the screen unit 13.

The display image adjusting menu 40 is started as another GUI by clicking the mouse on the image display portion 305 shown in FIG. 21, for example. The display image adjusting menu 40 may be started by methods other than that described above.

In the display system information providing window 300, "Maintenance 306" is selected from a "Tool" portion of a tool bar to start the maintenance window 100 shown in FIG. 7. The adjusting operation using the maintenance window 100 is as described with reference to the flowchart shown in FIGS. 8 to 12.

Thus, the display system 1 supplies position information of display units and cells forming the screen unit 13 to the adjusting unit 17 as screen information, thereby making it possible to display a pseudo screen in the maintenance window 100, which is an application program shown by a GUI, according to the screen information. Also, the display system 1 allows the pseudo screen displayed in the maintenance window 100, which is an application program shown by a GUI, according to the screen information to be controlled by means of a mouse when a display unit or a cell to be adjusted is selected.

In addition, when an abnormality occurs in a display unit forming the screen unit 13, the display system 1 can detect an abnormality signal of the display unit having the abnormality by means of the abnormality signal detecting unit 18, and then display the display unit having the abnormality and the nature of the abnormality in the maintenance window 100, which is an application program shown by a GUI, according to the abnormality signal. Moreover, when an abnormality occurs in one or more display units forming the screen unit 13, the abnormality display apparatus can display the one or more display units having the abnormality in the maintenance window 100 in a different color depending on the nature of the abnormality. Furthermore, when an abnormality occurs in one or more display units forming the screen unit 13, the display system 1 can activate a light emitting element in the rear of the one or more display units forming the screen unit 13 and having the abnormality by selecting the one or more display units having the abnormality and displayed in the maintenance window 100.

As described in detail, the adjusting apparatus according to the present invention generates a maintenance window for schematically displaying a plurality of display units forming a screen unit for displaying a specified image and a plurality of cells forming each of the plurality of display units, from position information of the display units and the cells, selects a specified display unit or cell from the display units or the cells spuriously displayed in the maintenance window, generates information for adjusting the selected display unit or cell on the basis of adjusting operation, and then adjusts the display unit or the cell by outputting the generated adjusting information to the screen unit. Therefore, it is possible to check information of the adjusting operation at a glance by using the maintenance window having a large display area. Also, since only the maintenance window is required as a display screen for adjustment, the cost of the apparatus can be reduced.

In addition, the adjusting apparatus according to the present invention selects a specified display unit or cell from the display units or the cells spuriously displayed in the maintenance window by using a pointing device such as a mouse in the maintenance window. Therefore, it is possible to make the selection efficiently and also make continuous adjustment of selected display units or cells.

Moreover, when selecting a specified display unit or cell from the display units or the cells spuriously displayed in the maintenance window by using a pointing device such as a mouse in the maintenance window, the adjusting apparatus according to the present invention makes the selected target emit totally white light on the screen unit. Therefore, even when the display units and the cells are increased with increase in the size of the screen unit, it is possible to make required adjustment without losing the target.

As described in detail, the adjusting method according to the present invention generates a maintenance window for schematically displaying a plurality of display units forming a screen unit for displaying a specified image and a plurality of cells forming each of the plurality of display units, from position information of the display units and the cells, selects a specified display unit or cell from the display units or the cells spuriously displayed in the maintenance window, generates information for adjusting the selected display unit or cell on the basis of adjusting operation, and then adjusts the display unit or the cell by outputting the generated adjusting information to the screen unit. Therefore, it is possible to check information of the adjusting operation at a glance by using the maintenance window having a large display area.

In addition, the adjusting method according to the present invention selects a specified display unit or cell from the display units or the cells spuriously displayed in the maintenance window by using a pointing device such as a mouse in the maintenance window. Therefore, it is possible to make the selection efficiently and also make continuous adjustment of selected display units or cells.

Moreover, when selecting a specified display unit or cell from the display units or the cells spuriously displayed in the maintenance window by using a pointing device such as a mouse in the maintenance window, the adjusting method according to the present invention makes the selected target emit totally white light on the screen unit. Therefore, even when the display units and the cells are increased with increase in the size of the screen unit, it is possible to make required adjustment without losing the target.

As described in detail, the recording medium according to the present invention, which medium is installed in the adjusting unit, stores a program for performing: maintenance window generating processing for generating a maintenance window for schematically displaying a plurality of display units forming a screen unit for displaying a specified image and a plurality of cells forming each of the plurality of display units, from position information of the display units and the cells; selecting processing for selecting a specified display unit or cell from the display units or the cells spuriously displayed in the maintenance window; and adjusting information generating processing for generating information for adjusting the selected display unit or cell on the basis of adjusting operation. When the program is run, the display unit or the cell is adjusted by outputting the adjusting information generated by the adjusting information generating processing to the screen unit. Therefore, it is possible to check information of the adjusting operation at a glance by using the maintenance window having a large display area.

In addition, when the program is run, a specified display unit or cell is selected from the display units or the cells spuriously displayed in the maintenance window by using a pointing device such as a mouse in the maintenance window. Therefore, it is possible to make the selection efficiently and also make continuous adjustment of selected display units or cells.

Moreover, when the program is run and a specified display unit or cell is selected from the display units or the cells spuriously displayed in the maintenance window by using a pointing device such as a mouse in the maintenance window, the selected target is made to emit totally white light on the screen unit. Therefore, even when the display units and the cells are increased with increase in the size of the screen unit, it is possible to make required adjustment without losing the target.

As described in detail, the abnormality display apparatus according to the present invention generates a maintenance window for schematically displaying a plurality of display units forming a screen unit for displaying a specified image and cells forming each of the plurality of display units, from position information of the display units and the cells, and distinguishably displays a pseudo display unit or cell corresponding to a display unit or a cell having an abnormality in the maintenance window on the basis of an abnormality signal supplied from the screen unit when the abnormality occurs in the display unit or the cell, which forms the screen unit. Therefore, it is possible to identify the abnormality of the display unit and the cell forming the screen unit immediately. Also, by displaying the pseudo display unit or cell in a different color depending on the nature of the abnormality, it is possible to identify the nature of the abnormality at a glance.

In addition, when selecting the pseudo display unit or cell corresponding to a display unit or a cell having an abnormality by using a pointing device such as a mouse, the pseudo display unit or cell being distinguishably displayed in the maintenance window on the basis of the abnormality signal supplied from the screen unit, the abnormality display apparatus according to the present invention can activate a light emitting element placed in the rear of the display unit or the cell having the abnormality in the screen unit, thereby making it possible to identify the display unit or the cell having the abnormality immediately. Therefore, it is possible to perform operation of replacing the display unit or the cell efficiently.

As described in detail, the abnormality display method according to the present invention generates a maintenance window for schematically displaying a plurality of display units forming a screen unit for displaying a specified image and cells forming each of the plurality of display units, from position information of the display units and the cells, and distinguishably displays a pseudo display unit or cell corresponding to a display unit or a cell having an abnormality in the maintenance window on the basis of an abnormality signal supplied from the screen unit when the abnormality occurs in the display unit or the cell, which forms the screen unit. Therefore, it is possible to identify the abnormality of the display unit and the cell forming the screen unit immediately. Also, by displaying the pseudo display unit or cell in a different color depending on the nature of the abnormality, it is possible to identify the nature of the abnormality at a glance.

In addition, when selecting the pseudo display unit or cell corresponding to a display unit or a cell having an abnormality by using a pointing device such as a mouse, the pseudo display unit or cell being distinguishably displayed in the maintenance window on the basis of the abnormality signal supplied from the screen unit, the abnormality display method according to the present invention can activate a light emitting element placed in the rear of the display unit or the cell having the abnormality in the screen unit, thereby making it possible to identify the display unit or the cell having the abnormality immediately. Therefore, it is possible to perform operation of replacing the display unit or the cell efficiently.

As described in detail, the recording medium according to the present invention, which medium is installed in the abnormality signal detecting unit, stores a program for performing: maintenance window generating processing for generating a maintenance window for schematically displaying a plurality of display units forming a screen unit for displaying a specified image and cells forming each of the plurality of display units, from position information of the display units and the cells; and distinguishable display processing for distinguishably displaying a pseudo display unit or cell corresponding to a display unit or a cell having an abnormality in the maintenance window on the basis of an abnormality signal supplied from the screen unit when the abnormality occurs in the display unit or the cell, which forms the screen unit. When the abnormality occurs in the display unit or the cell forming the screen unit, the program in operation makes it possible to immediately identify the display unit or the cell having the abnormality in the maintenance window. Also, by displaying the pseudo display unit or cell in a different color depending on the nature of the abnormality, it is possible to identify the nature of the abnormality at a glance.

In addition, when selecting the pseudo display unit or cell corresponding to a display unit or a cell having an abnormality by using a pointing device such as a mouse, the pseudo display unit or cell being distinguishably displayed in the maintenance window on the basis of the abnormality signal supplied from the screen unit, the program in operation can activate a light emitting element placed in the rear of the display unit or the cell having the abnormality in the screen unit, thereby making it possible to identify the display unit or the cell having the abnormality immediately. Therefore, it is possible to perform operation of replacing the display unit or the cell efficiently.

While a preferred embodiment of the invention has been described using specific terms, such description is for illustrative purposes only, and it is to be understood that changes and variations may be made without departing from the spirit or scope of the following claims.

What is claimed is:

1. An abnormality display apparatus for displaying an abnormality of a display apparatus, the display apparatus being formed of a plurality of video display units arranged in a matrix and which combine to display an image based on an input video signal, each given one of the plurality of video display units displaying a respective portion of the image based on the position of that display unit in the matrix, the display apparatus having screen information supplying means for supplying screen information including at least position information indicating respective positions of each one of said plurality of individual video display units in the matrix for and/or layout information indicating a number of horizontal display units and a number of vertical display units forming the matrix, and abnormality signal generating means for generating an abnormality signal when the abnormality occurs in an individual one of the plurality of video display units, said abnormality display apparatus comprising:

pseudo screen displaying means for displaying a pseudo screen window that concurrently and schematically represents all of the plurality of video display units that form the display apparatus as a corresponding plurality of pseudo display units, each given one of the plurality of pseudo display units being arranged in the pseudo screen window according to the position of its corresponding display unit in the matrix based on the screen information supplied by said screen information supplying means, the particular one of the plurality of pseudo display units that corresponds to the individual video display unit having the abnormality being distinguishably displayed in the pseudo screen window of said pseudo screen displaying means based on the abnormality signal generated by the abnormality signal generating means.

2. The abnormality display apparatus according to claim 1, further comprising abnormal unit information displaying means for displaying information on a nature of said abnormality based on said abnormality signal generated by said abnormality signal generating means.

3. The abnormality display apparatus according to claim 1, further comprising selecting means for selecting a specified pseudo display unit from said plurality of pseudo display units displayed in said pseudo screen window of said pseudo screen displaying means, wherein when said selecting means selects said pseudo display unit distinguishably displayed in said pseudo screen window said abnormality is notified to said individual video display unit corresponding to said pseudo display unit.

4. The abnormality display apparatus according to claim 1, wherein the abnormality signal indicates at least one of a temperature abnormality, a fan stoppage, and a power abnormality in the individual video display unit having the abnormality.

5. The abnormality display apparatus according to claim 1, wherein the pseudo screen window distinguishably displays the display unit corresponding to the individual video display unit having the abnormality to correspond to information on a nature of the abnormality.

6. An abnormality display method for displaying an abnormality in a display apparatus, the display apparatus being formed of a plurality of video display units arranged in a matrix and which combine to display an image based on an input video signal, each given one of the plurality of video display units displaying a respective portion of the image based on the position of that display unit in the matrix, the display apparatus having screen information supplying means for supplying screen information including at least position information indicating respective positions of each one of said plurality of individual video display units in the matrix for and/or layout information indicating a number of horizontal display units and a number of vertical display units forming the matrix, and abnormality signal generating means for generating an abnormality signal when the abnormality occurs in an individual one of the plurality of video display units, said abnormality display method comprising the steps of:

displaying a pseudo screen window that concurrently and schematically represents all of the plurality of video display units that form the display apparatus as a corresponding plurality of pseudo display units, each given one of the plurality of pseudo display units being arranged in the pseudo screen window according to the position of its corresponding display unit in the matrix based on the screen information supplied by said screen information supplying means;

generating the abnormality signal when the abnormality occurs in the individual video display unit; and distinguishably displaying, in said pseudo screen window, the particular one of the plurality of display units that corresponds to the individual video display unit having the abnormality based on the generated abnormality signal.

7. The abnormality display method according to claim 6, wherein the abnormality signal indicates at least one of a temperature abnormality, a fan stoppage, and a power abnormality in the individual video display unit having the abnormality.

8. The abnormality display method according to claim 6, wherein the pseudo screen window distinguishably displays the display unit corresponding to the individual video display unit having the abnormality to correspond to information on a nature of the abnormality.

9. A recording medium storing a program having instructions for carrying out a method of displaying an abnormality in a display apparatus, the display apparatus being formed of a plurality of video display units arranged in a matrix and which combine to display an image based on an input video signal, each given one of the plurality of video display units displaying a respective portion of the image based on the portion of that display unit in the matrix, the display apparatus having screen information supplying means for supplying screen information including at least position information indicating respective positions of each one of said plurality of individual video display units in the matrix for and/or layout information indicating a number of horizontal display units and a number of vertical display units forming the matrix and abnormality signal generating means for generating an abnormality signal when the abnormality occurs in an individual one of the plurality of video display units, said method comprising: displaying a pseudo screen window that concurrently and schematically represents all of the plurality of video display units that form the display apparatus as a corresponding plurality of pseudo display units, each given one of the plurality of pseudo display units being arranged in the pseudo screen window according to the position of its corresponding display units in the matrix based on the screen information supplied by said screen information supplying means; generating the abnormality signal when the abnormality occurs in the individual video display unit; and distinguishably displaying, in said pseudo screen window, the particular one of the plurality of display units that corresponds to the individual video display unit having the abnormality based on the generated abnormality signal.

* * * * *